United States Patent [19]

Ishikawa et al.

[11] Patent Number: 5,513,290
[45] Date of Patent: Apr. 30, 1996

[54] COUPLING STRUCTURE OF OPTICAL FIBERS AND OPTICAL WAVEGUIDES

[75] Inventors: Shinji Ishikawa; Hiroshi Suganuma; Dai Yui; Shigeru Semura; Masahide Saito; Shigeru Hirai, all of Yokohama, Japan

[73] Assignee: Sumitomo Electric Industries, Ltd., Osaka, Japan

[21] Appl. No.: 383,930

[22] Filed: Feb. 6, 1995

Related U.S. Application Data

[63] Continuation of Ser. No. 274,441, Jul. 13, 1994, abandoned.

[30] Foreign Application Priority Data

Jul. 14, 1993 [JP] Japan .................................. 5-174393
Feb. 2, 1994 [JP] Japan .................................. 6-11015

[51] Int. Cl.$^6$ .............................. G02B 6/255; G02B 6/30
[52] U.S. Cl. ................... 385/49; 385/51; 385/97; 385/98; 385/99
[58] Field of Search .................................. 385/14, 49, 51, 385/95, 97, 98, 99

[56] References Cited

U.S. PATENT DOCUMENTS

| | | | |
|---|---|---|---|
| 4,744,619 | 5/1988 | Cameron ................................. | 385/49 |
| 4,772,086 | 9/1988 | Bellerby et al. ........................ | 385/49 |
| 4,930,854 | 6/1990 | Albares et al. ......................... | 385/49 |
| 4,953,936 | 9/1990 | Regener et al. ........................ | 385/49 |
| 5,091,986 | 2/1992 | Arii et al. ............................... | 385/48 |
| 5,175,781 | 12/1992 | Hockaday et al. ..................... | 385/49 |
| 5,231,683 | 7/1993 | Hockaday et al. ..................... | 385/49 |
| 5,297,228 | 3/1994 | Yanagawa et al. ..................... | 385/129 |

FOREIGN PATENT DOCUMENTS 0541820  5/1993  European Pat. Off. ............. 385/49 X

OTHER PUBLICATIONS

Patent Abstracts of Japan, vol. 14, No. 585 (P–1148) Dec. 27, 1990 & JP–A–02 253 206 (NTT).
Patent Abstracts of Japan, vol. 5, No. 120 (C–065) Aug. 4, 1981 & JP–A–56 057 803 (Somar Corp).
Patent Abstracts of Japan, vol. 15, No. 433 (P–1271) Nov. 5, 1991 & JP–A–03 179 406 (Furukawa).
Patent Abstracts of Japan, vol. 16, No. 555 (P–1454) Nov. 24, 1992 & JP–A–04 212 113 (NTT).

*Primary Examiner*—Brian Healy
*Attorney, Agent, or Firm*—Cushman, Darby & Cushman

[57] ABSTRACT

There is disclosed a coupling structure of optical fibers and optical waveguides, comprising optical fibers; an optical fiber arranging connector having a first and second members, the optical fibers being sandwiched by the first and second members to be fixed in the optical fiber arranging connector; a waveguide device having a waveguide substrate, optical waveguides being formed on a surface of the waveguide device, ends of the waveguides and ends of being aligned with each other by abutting end faces thereof against each other; an adhesive interposed and set between said end faces, the adhesive being a photo-setting adhesive, the first member being made of a material preventing light having a wavelength capable of setting said adhesive from passing therethrough, and in at least part of a region where the end faces of the optical fiber arranging connector and the waveguide device oppose to each other, at least one of the optical fiber arranging connector and the waveguide device in the vicinity of the end face thereof being made of a light-transmitting material through which light having a wavelength capable of setting the adhesive can pass.

30 Claims, 21 Drawing Sheets

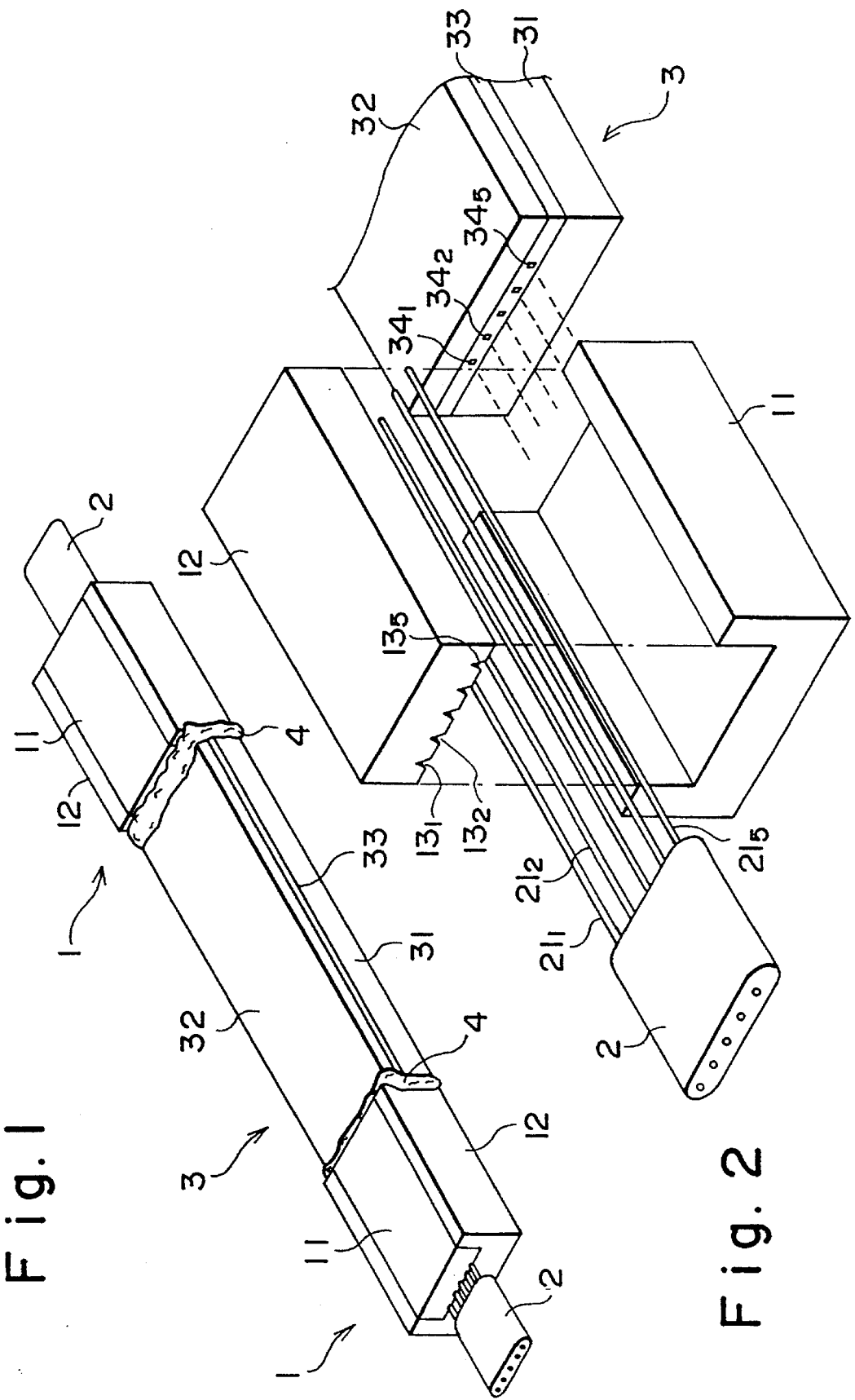

(LONGITUDINAL SECTIONAL VIEW)

(VIEW OF COUPLED END FACE)

Fig. 48

EXPERIMENTAL RESULT (WHEN CONNECTED TO LINEAR WAVEGUIDE)

| LIGHT-TRANSMITTING MATERIAL | LOSS AFTER PHOTO-SETTING | LOSS AFTER THERMOSETTING | FLUCTUATION IN SETTING |
|---|---|---|---|
| NONE | 0.15 dB | 0.30 dB | +0.15 |
| $SiO_2$ GLASS | 0.25 dB | 0.23 dB | −0.02 |
| $SiO_2 \cdot Na_2O - Al_2O_3$ GLASS | 0.28 dB | 0.29 dB | +0.01 |

CONDITION FOR PHOTO-SETTING : 10 mW/cm² × 200 SECONDS

CONDITION FOR THERMO-SETTING : 80 °C, 12 HOURS, IN $N_2$ GAS FLOW

Fig. 49

THERMAL EXPANSION CHARACTER AND LIGHT ABSORPTION CHARACTER OF VARIOUS TYPES OF MATERIALS

| MATERIAL | THERMAL EXPANSION COEFFICIENT($\times 10^{-6} K^{-1}$) | LIGHT ABSORPTION EDGE(nm) |
|---|---|---|
| Si | 3.2 | 1100 |
| SiO$_2$ | 0.5 | 170 |
| Y-ZrO$_2$ (CONTAINING 3%-Y$_2$O$_3$) | 9.6 | — *2 |
| SD2 *1 | 3.2 | 350 |
| SD1 *1 | 3.1 | 330 |
| PHENOL RESIN (CONTAINING 80%-FILLER) | 14.2 | — *2 |
| PHENOL RESIN (CONTAINING 90%-FILLER) | 6.0 | — *2 |
| PMMA | 60.0 | 400 |
| GLASS FIBER REINFORCED POLYCARBONATE | 37 | 420 |

*1 : GOODS OF GLASS CONTAINING SiO$_2$ AS A MAJOR COMPONENT (MANUFACTURED BY HOYA Co.)

*2 : OPACITY BASED SCATTERING

COUPLING STRUCTURE OF OPTICAL FIBERS AND OPTICAL WAVEGUIDES

This is a continuation of application Ser. No. 08/274,441, filed Jul. 13, 1994, now abandoned.

BACKGROUND OF THE INVENTION

1. Field of the Invention

The present invention relates to a coupling structure of optical fibers and optical waveguides which is used in an optical communication system as an optical waveguide module having an optical waveguide circuit.

2. Related Background Art

In the field of optical communications, for the purpose of, e.g., processing signals from optical fibers by optical waveguides, a coupling structure in which the optical fibers and the optical waveguides are optically coupled is sometimes needed.

For example, in a conventional coupling structure in which optical fibers and optical waveguides are coupled by welding, an optical fiber arranging connector in which a multi optical fiber extending from a ribbon fiber is arranged, and a waveguide substrate on which an optical waveguide layer including a multi optical waveguide is formed, are fixed in separate metal members. The end faces of the optical fiber arranging connector and the waveguide substrate respectively fixed in the metal members are abutted against each other, and the optical fibers and the optical waveguides are aligned with each other. Then, the metal members are welded with each other by using, e.g., a YAG laser.

In the above coupling structure, however, since the metal members are deformed during welding, the optical waveguides and the optical fibers cause misalignment to increase the light transmission loss of the coupling structure. Since the metal members are used as metal housings of the optical fiber arranging connector and the optical waveguide layer, the manufacturing cost becomes very high. Thus, a demand has arisen for a coupling structure of optical fibers and optical waveguides free from these problems.

In a conventional coupling structure in which optical fibers and optical waveguides are coupled by using a photo-setting (photo-curable) adhesive, a multi optical fiber extending from a ribbon fiber is arranged by being fixed in, e.g., the V-grooves of a glass optical fiber arranging connector. A waveguide substrate on which an optical waveguide layer including a multi optical waveguide is formed is mounted in a glass member, and the optical fibers and the optical waveguides are aligned with each other. A photo-setting adhesive is injected between the end faces of the optical fiber arranging connector and the glass member to be coupled, and light is radiated from the peripheral portion, thereby setting the photo-setting adhesive. In order to sufficiently set the photo-setting adhesive, as described above, the optical fiber arranging connector is made of a glass material (e.g., quartz glass) which transmits light having a wavelength capable of setting the adhesive (e.g., an ultraviolet-curing resin) at a high transmittance.

In the above coupling structure, the optical fiber arranging connector is connected to one or two ends, i.e., one or both of the input and output portions, of the waveguide substrate.

A prior art technique concerning the coupling structure of optical fibers and optical waveguides in which an optical fiber arranging connector and a waveguide substrate are adhered by using a photo-setting adhesive is described in, e.g., "IEEE Photonics Technology Letters, Vol. 4, No. 8, pp. 906–908, August 1992" in detail. A prior art technique concerning the coupling structure of optical fibers and optical waveguides in which an optical fiber arranging connector and a waveguide substrate are mechanically fixed is described in, e.g., "Ceramics 29, No. 4, pp. 319–321, 1994" in detail.

A prior art technique concerning the coupling structure of optical fibers and optical waveguides in which optical fibers are directly fitted in a processed waveguide substrate is described in, e.g., Japanese Patent Laid-Open No. 63-279206 (French Patent No. 8,703,385, Mar. 12, 1987), Japanese Patent Laid-Open No. 1-186905 (French Patent No. 8,716,398, Nov. 26, 1987), and International Patent Laid-Open No. 4-507153 (French Patent No. 9,002,575, Mar. 1, 1990) in detail.

A prior art technique concerning the coupling structure of optical fibers and optical waveguides in which quartz glass housings respectively incorporating a waveguide substrate and an optical fiber arranging connector are welded with each other by heating is described in, e.g., Japanese Patent Laid-Open No. 2-253206 in detail. A prior art technique concerning the coupling structure of optical fibers and optical waveguides in which optical fibers are directly adhered to a waveguide substrate is described in, e.g., Japanese Patent Laid-Open No. 5-173039 (U.S. Pat. No. 5,185,835, Feb. 9, 1993) in detail.

SUMMARY OF THE INVENTION

However, in the conventional structures in which coupling is made by using a photo-setting adhesive, a fiber arranging substrate constituting the optical fiber arranging connector must be made of a light-transmitting material, e.g., quartz glass, which transmits light having a wavelength capable of setting the adhesive at a high transmittance. More specifically, a silicon substrate is generally used as a fiber arranging substrate because it can be processed easily. Then, however, light having a wavelength capable of setting the adhesive is not transmitted between the end faces of the fiber arranging substrate and the waveguide substrate at a high transmittance, and the adhesive remains in the liquid form in most of the region between the end faces where guarantee of a high adhesion strength is most important. For this reason, in the conventional structures, e.g., a quartz glass plate is used as the fiber arranging substrate. This, however, causes another problem of difficult processing. More specifically, in order to improve the alignment precision, the arranging substrate must be subjected to precision grinding to form arranging grooves used for arranging optical fibers at high precision. This precision grinding is not easy for existing light-transmitting materials, e.g., quartz glass. Accordingly, when, e.g., a quartz glass plate is used as the arranging substrate, the operation of forming the arranging grooves becomes very cumbersome. Then, the manufacture time of the coupling structure is prolonged, and it is difficult to arrange optical fibers at high positional precision.

More specifically, when an optical fiber arranging connector and an optical waveguide device are coupled by using a photo-setting adhesive, if the material of the arranging substrate is selected by considering good formability of the fiber arranging grooves in the arranging substrate, light transmission becomes insufficient, and the adhesive is not sufficiently set especially between the end faces of the optical fiber arranging connector and the optical waveguide device. Even if the optical fiber arranging connector and the optical waveguide device are aligned before the adhesive is set, misalignment is increased as time passes or by a temperature change, causing an increase in light transmission loss and a decrease in environmental durability. On the other hand, if the material of the arranging substrate is selected by considering light transmission, since the optical fiber arranging grooves are difficult to form, the positional precision of the optical fiber arrangement is decreased, and it becomes difficult to align all of the multi optical fiber and the multi optical waveguide at high precision, causing a decrease in basic characteristics of the optical device. In this manner, in the conventional optical coupling structures using a photo-setting adhesive, a trade-off relationship exists in the manufacture between a demand for aligning the optical fibers and optical waveguides at high precision and a demand for maintaining high reliability of the manufactured optical coupling structure over time.

A silicon substrate may be employed as the fiber arranging substrate by using a thermosetting adhesive in place of the photo-setting adhesive. However, since the adhesive usually requires at least 30 minutes to thermoset, the productivity is low. In addition, since an alignment stage for the optical fibers and the optical waveguides is deformed by heat, aligned cores cause positional errors while the adhesive is set.

The present invention has been made in view of the above problems, and has as its object to provide a coupling structure of optical fibers and optical waveguides, which can be manufactured in accordance with a systematic short-time process, which can align the multi optical fiber and the multi optical waveguide with each other at high precision, which has a small light transmission loss over a long period of time, and which has a high environmental durability against, e.g., a temperature change.

In order to achieve the above object, according to the present invention, there is provided a coupling structure of optical fibers and optical waveguides, comprising: optical fibers; an optical fiber arranging connector having a first and second members, the optical fibers being sandwiched by the first and second members to be fixed in the optical fiber arranging connector; a waveguide device having a waveguide substrate, optical waveguides being formed on a surface of the waveguide device, ends of the waveguides and ends of being aligned with each other by abutting end faces thereof against each other; and an adhesive interposed and set between the end faces, the adhesive being a photo-setting adhesive, the first member being made of a material preventing light having a wavelength capable of setting the adhesive from passing therethrough, and in at least part of a region where the end faces of the optical fiber arranging connector and the waveguide device oppose to each other, at least one of the optical fiber arranging connector and the waveguide device in the vicinity of the end face thereof being made of a light-transmitting material through which light having a wavelength capable of setting the adhesive can pass.

The light-transmitting material may be preferably a material having a thermal expansion coefficient of less than $6\times10^{-5}$ [/K], more preferably $1\times10^{-5}$ [/K]. In this case, it is preferable that the light-transmitting material is glass containing $SiO_2$ as a major component. Especially, it is preferable that the light-transmitting material is glass having a thermal expansion coefficient coinciding with that of silicon within a range of ±20%. It is preferable that the light-transmitting material is a resin having a light absorption edge at a wavelength of not more than 450 nm.

The adhesive may be a photo-setting/thermosetting adhesive containing a thermosetting initiator in addition to a photo-setting initiator. In this case, it is preferable that the adhesive is coated to be interposed between the end face of the optical fiber arranging connector and the end face of the waveguide device, photo-set by light radiation, and thereafter thermoset by heat.

The waveguide substrate may have an end face opposing the end face of the optical fiber arranging connector through the adhesive, and at least part of the waveguide substrate in at least the vicinity of the end face thereof may be made of the light-transmitting material that can transmit light having the wavelength capable of setting the adhesive.

The waveguide device may have the waveguide substrate and a waveguide covering member that covers a surface of the waveguide substrate on which the optical waveguides are formed, and the waveguide covering member may have an end face opposing the end face of the fiber arranging connector through the adhesive, and at least part of the waveguide covering member in at least the vicinity of the end face thereof may be made of the light-transmitting material that can transmit light having a wavelength capable of setting the adhesive. In this case, it is preferable that the light-transmitting material is constituted as part of the end face of the waveguide covering member opposing the end face of the optical fiber arranging connector to have a sectional area of not less than 1.0 $mm^2$.

The first member may be a fiber arranging substrate having a surface on which arranging grooves for the optical fibers are formed. In this case, it is preferable that the fiber arranging substrate is made of a material having a thermal expansion coefficient of less than $6\times10^{-5}$ [/K], more preferably $1\times10^{-5}$ [/K]. Especially, it is preferable that the fiber arranging substrate is made of silicon, and the arranging grooves are formed by mechanical processing or anisotropic etching. It is preferable that the fiber arranging substrate is made of a ceramic material, and the arranging grooves are formed during sintering the ceramic material.

It is preferable that the fiber arranging substrate is made of a plastic material, and the arranging grooves are formed during molding the plastic material. It is preferable that the plastic material is a phenol resin containing a filler.

The second member may be a fiber fixing member, adhered to the fiber arranging substrate, for fixing the optical fibers in the arranging grooves, and the end face of the fiber fixing member may oppose the end face of the waveguide device through the adhesive, and at least part of the fiber fixing member in at least the vicinity of the end face thereof may be made of the light-transmitting material that can transmit light having a wavelength capable of setting the adhesive.

The first and second members may be integrally formed by molding a plastic material.

One end face of the waveguide device may oppose an end face of a first optical fiber arranging connector as an optical input portion, and the other end face of the waveguide device may oppose an end face of a second optical fiber arranging connector as an optical output portion.

In the coupling structure of the optical fibers and the optical waveguides of the present invention, the optical fiber arranging connector is constituted by the first and second members that fix the optical fibers therein. The first member is made of a material that does not transmit light having a wavelength capable of setting the adhesive. Thus, the first member is not made of a light-transmitting material, e.g., quartz glass, but is made of, e.g., silicon, so that it can be processed easily. Then, the optical fiber arranging grooves can be formed in the first member in accordance with a short-time, simple process at high positional precision. As the multi optical fiber and the multi- optical waveguide are aligned with each other at high precision, a coupling structure having a small transmission loss in the coupled end faces can be obtained.

In part of a region where the end faces oppose each other, at least one of the optical fiber arranging connector and the waveguide device in the vicinity of the end face thereof is made of a light-transmitting material that can transmit light having a wavelength capable of setting the adhesive. When light is radiated through the light-transmitting portion made of the light-transmitting material, a thin film formed by the photo-setting adhesive interposed between the end faces, especially in the vicinity of the coupled end faces, of the optical fibers and the optical waveguides can be set easily and reliably over a wide area. If the optical fibers and the optical waveguides are aligned with each other before the adhesive is set, this aligned state can be stably maintained.

With the combination of the high processing precision of the arranging grooves for fixing the optical fibers and the high setting properties of the adhesive, a coupling structure having a small light transmission loss over a long period of time and a high environmental resistance can be realized.

First, the optical waveguides of the waveguide device and the optical fibers of the optical fiber arranging connector are aligned with each other. Subsequently, the end face of the optical fiber arranging connector is adhered by polymerization on the end face of the waveguide device with a photo-setting/thermosetting adhesive. When polymerization adhesion is completed in this manner, light is radiated from the peripheral portions of the adhesion surfaces, on which the adhesive is coated, at a predetermined intensity for a predetermined period of time, thereby photo-setting the adhesive. Thereafter, the optical waveguide module is heated at a predetermined temperature for a predetermined period of time, in order to thermoset the adhesive, so that the adhesive is substantially and finally set and fixed. Then, the optical waveguides and the optical fibers can be firmly mounted and fixed with each other.

When the waveguide device has a waveguide covering member that covers an optical waveguide forming surface on the waveguide substrate, if the waveguide covering member made of a light-transmitting material is formed in part of the connection region of the optical fiber arranging connector and the waveguide device to have a sectional area of 1.0 mm$^2$ or more, this waveguide covering member fixes part of the adhesion surface which is not completely fixed during photo-setting. Thus, a fluctuation in loss during thermosetting reaction is suppressed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a perspective view showing the overall arrangement of a coupling structure of optical fibers and optical waveguides according to an embodiment of the present invention;

FIG. 2 is an perspective view showing the exploded arrangement of the main part of the coupling structure of the optical fibers and the optical waveguides shown in FIG. 1;

FIG. 48 is a table showing a fluctuation in light transmission loss obtained after the adhesive is photo-set and after the adhesive is thermoset in a coupling structure of the optical fibers and the optical waveguides shown in FIG. 47; and FIG. 49 is a table showing a thermal expansion character and a light absorption character of various types of materials used in the optical waveguide module.

DESCRIPTION OF THE PREFERRED EMBODIMENT

Figure 3:
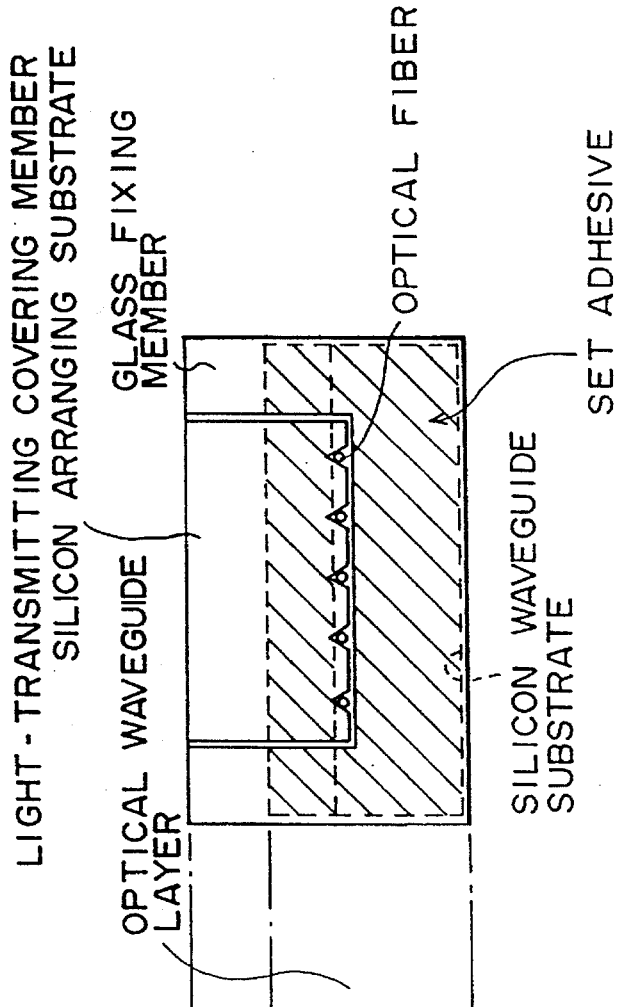
FIG. 3 is a longitudinal sectional view showing the structure in the vicinity of the coupled end faces of the optical fibers and the optical waveguides shown in FIG. 1.

The arrangement and function of the preferred embodiment of the present invention will be described in detail with reference to FIGS. 1 to 48. In the description of the drawings, the same components are denoted by the same reference numerals, and a repetitive description will be omitted. The ratio of the size shown in the drawings does not necessarily coincide with that given by a description.

FIG. 1 is a perspective view showing the overall arrangement of a coupling structure of optical fibers and optical waveguides according to an embodiment of the present invention. FIG. 2 is an perspective view showing the exploded arrangement of the main part of the coupling structure of the optical fibers and the optical waveguides shown in FIG. 1. In this coupling structure of the optical fibers and the optical waveguides, as shown in FIG. 1, optical fiber arranging connectors 1 and a waveguide device 3 are fixed to each other with an ultraviolet-curing resin adhesive 4 by abutting their end faces against each other.

As shown in FIG. 2, each optical fiber arranging connector 1 is constituted to have a fixing plate 11 made of quartz glass and formed with a recessed portion so that it has a substantially U-shaped section, and an arranging substrate 12 made of silicon and formed to have such a size that it is fitted in this recessed portion. Five arranging grooves $13_1$ to $13_5$ having a V-shaped section are formed in the lower surface of the arranging substrate 12 parallel to each other at the same interval. Five optical fibers $21_1$ to $21_5$ extending from a ribbon fiber 2 entirely covered with a resin are buried in these arranging grooves $13_1$ to $13_5$. When the arranging substrate 12 is fitted in and fixed in the recessed portion of the fixing plate 11, the five optical fibers $21_1$ to $21_5$ are aligned in an array and held.

The waveguide device 3 is constituted to have a silicon waveguide substrate 31 and a light-transmitting waveguide covering member 32 provided on the waveguide substrate 31. A thin optical waveguide layer 33 is formed on the upper surface of the waveguide substrate 31, i.e., on the surface of the waveguide substrate 31 contacting the waveguide covering member 32 (this waveguide covering member 32 is not an indispensable element of the present invention as will be described later), to be integral with the waveguide substrate 31. Five optical waveguides $34_1$ to $34_5$ are formed in the optical waveguide layer 33 to serve as cores.

The optical waveguide layer 33 is generally formed by forming an $SiO_2$ glass layer (cladding layer) on a silicon substrate (waveguide substrate 31) by the flame deposition method, depositing an $SiO_2$ layer containing a dopant and having a high refractive index on the $SiO_2$ glass layer and etching this $SiO_2$ layer, thus forming cores (the optical waveguides $34_1$ to $34_5$), and depositing an $SiO_2$ layer serving as an upper cladding layer. Accordingly, the arrangement pitch of the optical waveguides $34_1$ to $34_5$ can be set at high precision to coincide with the arrangement pitch of the optical fibers $21_1$ to $21_5$ of the optical fiber arranging connector 1.

In this coupling structure of the optical fibers and the optical waveguides in which the end faces of the optical fiber arranging connector 1 and the waveguide device 3 are abutted against each other and fixed with the resin adhesive 4, the end face of the silicon arranging substrate 12 opposes the end face of the light-transmitting waveguide covering member 32, and the end face of the silicon waveguide substrate 31 opposes the end face of the quartz-glass fixing plate 11. Part of the resin adhesive 4 not only swells to be present on the outer peripheral portions of the end faces of the optical fiber arranging connector 1 and the waveguide device 3 but also is present between these end faces as a thin film.

The first characteristic feature of this embodiment is that the arranging substrate 12 is formed by processing a silicon wafer. As silicon can be easily precision-ground, the arranging grooves $13_1$ to $13_5$ can be formed at high positional precision by using a diamond blade or the like. The arranging grooves $13_1$ to $13_5$ can also be formed to have a correct V shape at high positional precision by applying an anisotropic etching technique of the semiconductor process.

The second characteristic feature of this embodiment is that both the fixing plate 11 fixed on the arranging grooves $13_1$ to $13_5$ and the waveguide covering member 32 arranged on the upper portion of the waveguide substrate 31 are made of a light-transmitting material (e.g., quartz glass or ultraviolet-transmitting resin), and that the arranging substrate 12 and the waveguide substrate 31, which are made of silicon and which do not transmit ultraviolet rays and visible light respectively, oppose the fixing plate 11 and waveguide covering member 32, which transmit ultraviolet rays and visible light respectively. For this reason, when the resin adhesive 4 is interposed between the end faces of the optical fiber arranging connector 1 and the waveguide device 3 and light is radiated through the light-transmitting (transmits light having a wavelength capable of setting the resin adhesive 4) fixing plate 11 and waveguide covering member 32, not only the exposed resin adhesive 4 but also the thin film of the resin adhesive 4 between the end faces is set, thereby firmly fixing the optical fiber arranging connector 1 and the waveguide device 3 with each other.

Therefore, according to this embodiment, with the combination of the above two characteristic features, the following remarkable effects can be obtained.

First, since the arranging substrate 12 is made of silicon, the arranging grooves $13_1$ to $13_5$ can be formed to have a highly precise shape at accurate positions, so that the optical fibers $21_1$ to $21_5$ can be arranged at high precision only by fixing the fixing plate 11. Hence, alignment of the optical fibers $21_1$ to $21_5$ with the optical waveguides $34_1$ to $34_5$ in a step before setting the resin adhesive 4 can be performed easily at high precision.

Second, since the resin adhesive 4 can be set well even between the end faces, the aligned state can be stably held. That is, since misalignment is not caused even if a stress acts due to mechanical impact and temperature change during use, the light transmission characteristics can be maintained over a long period of time.

Figure 4:
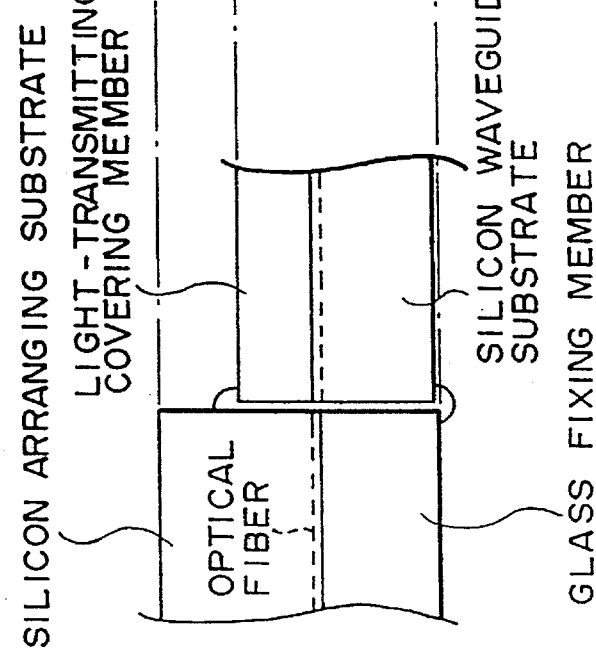
FIG. 4 is a cross-sectional view showing the structure of the coupled end faces shown in FIG. 3.

FIG. 3 is a longitudinal sectional view showing the structure in the vicinity of the coupled end faces of the optical fibers and the optical waveguides shown in FIG. 1. FIG. 4 is a cross-sectional view showing the structure of the coupled end faces shown in FIG. 3. As shown in FIG. 3, if one of the elements constituting the opposing end faces has light transmission properties, the resin adhesive 4 at this portion is set. Hence, the set adhesive covers a wide range, as indicated by a hatched portion in FIG. 4.

In addition to this embodiment, various modifications can be made. These modifications will be described with reference to longitudinal sectional views of FIGS. 5 to 23.

Figure 5:
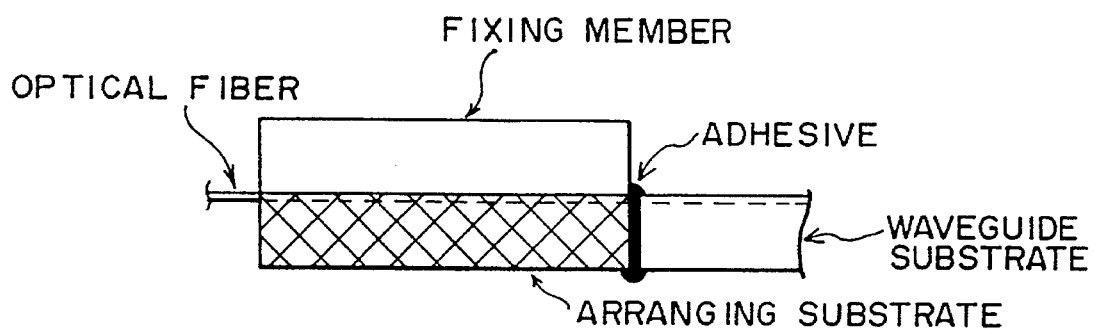
FIGS. 5 and 6 are longitudinal sectional views showing the structure of a modification of the coupling structure of the optical fibers and the optical waveguides shown in FIG. 1, in which the end faces of an arranging substrate and a waveguide substrate are adhered to each other.
Figure 6:
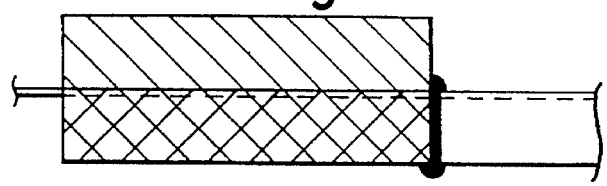
Figure 7:
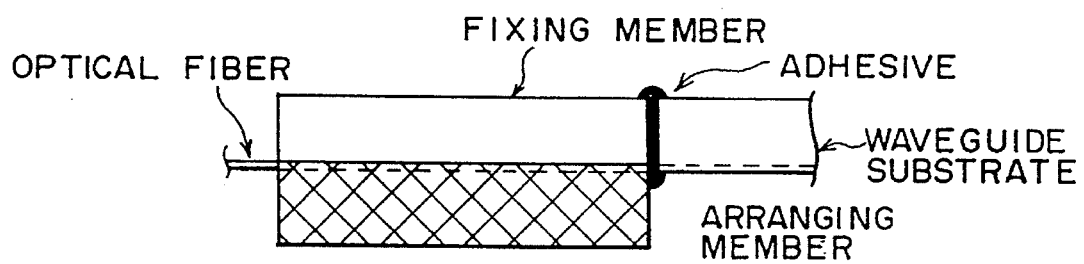
FIGS. 7 to 9 are longitudinal sectional views showing the structure of a modification of the coupling structure of the optical fibers and the optical waveguides shown in FIG. 1, in which the end faces of a fixing member and a waveguide substrate are adhered to each other.
Figure 8:
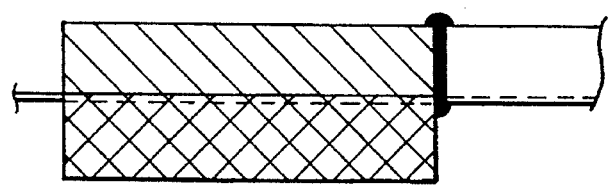
Figure 9:
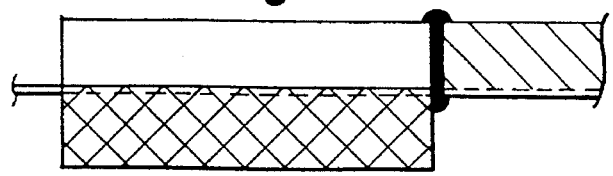
Figure 10:
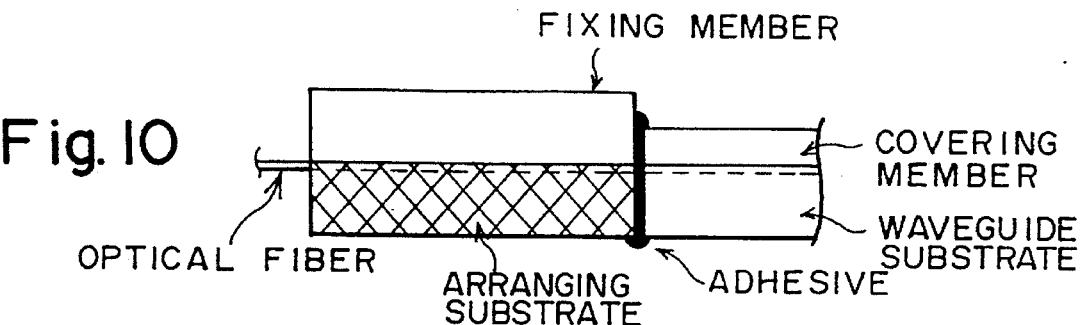
FIGS. 10 to 16 are longitudinal sectional views showing the structure of a modification of the coupling structure of the optical fibers and the optical waveguides shown in FIG. 1 in which the end faces of an arranging substrate and a waveguide substrate and the end faces of a fixing member and a covering member are adhered to each other.
Figure 11:
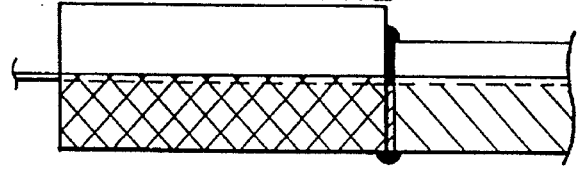
Figure 12:
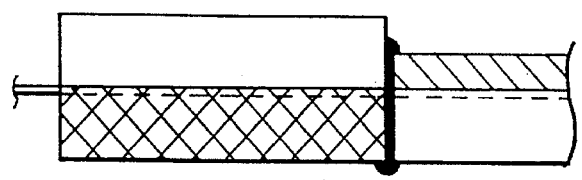
Figure 13:
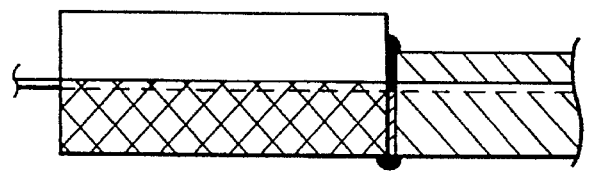
Figure 14:
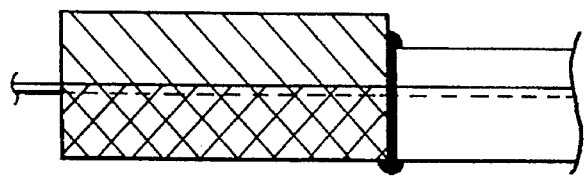

FIGS. 5 and 6 are longitudinal sectional views showing the structure of a modification in which the end faces of an arranging substrate and a waveguide substrate are adhered to each other. FIGS. 7 to 9 are longitudinal sectional views showing the structure of a modification in which the end faces of a fixing member and a waveguide substrate are adhered to each other. FIGS. 10 to 16 are longitudinal sectional views showing the structure of a modification in which the end faces of an arranging substrate and a waveguide substrate and the end faces of a fixing member and a covering member are adhered to each other. FIGS. 17 to 23 are longitudinal sectional views showing the structure of a modification in which the end faces of an arranging substrate and a covering member and the end faces of a fixing member and a waveguide substrate are adhered to each other.

The expression of the drawings will be described. A fiber arranging substrate made of silicon is indicated by a crosshatched portion in the lower left portion in the drawings, and optical fibers are buried in the arranging grooves in the upper surface of the fiber arranging substrate. A fiber fixing member is set on the upper surface of the optical fiber arranging substrate, and the optical fibers and the optical waveguides of the waveguide substrate are aligned with each other.

A blank portion indicates a light-transmitting material (a material that transmits light capable of setting a photo-setting adhesive, e.g., quartz glass), a hatched portion indicates a material that does not transmit light (e.g., silicon), an adhesive shown as a solid portion indicates a photo-set adhesive, and an adhesive shown as a hatched portion indicates a liquid adhesive.

If the waveguide substrate has light transmission properties, the adhesive is set at least at the end face of the waveguide substrate, so that coupling can be made firmly (see FIGS. 5, 6, 7, 8, 10, 12, 14, 16, 17, 19, 21, and 23). The same applies to a case wherein the waveguide covering member has light transmission properties (see FIGS. 10, 11, 14, 15, 17, 18, 21, and 22). In contrast to these, if only the fixing member is transparent, good coupling can be made only when its end face opposes the end face of the waveguide substrate or waveguide covering member (see, e.g., FIGS. 9, 13, 20).

Figure 15:
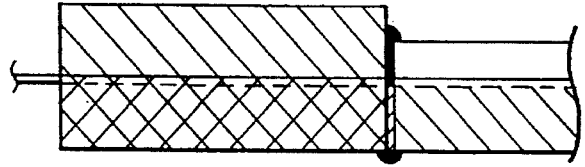
Figure 16:
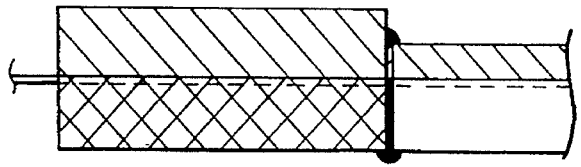
Figure 17:
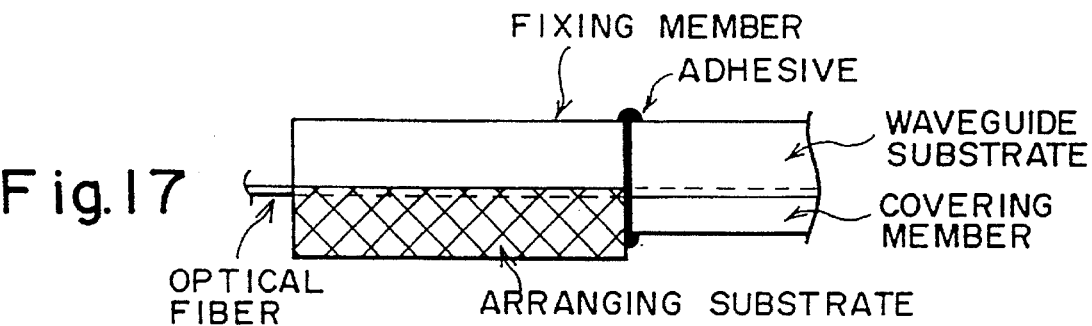
FIGS. 17 to 23 are longitudinal sectional views showing the structure of a modification of the coupling structure of the optical fibers and the optical waveguides shown in FIG. 1, in which the end faces of an arranging substrate and a covering member and the end faces of a fixing member and a waveguide substrate are adhered to each other.
Figure 18:
Figure 19:
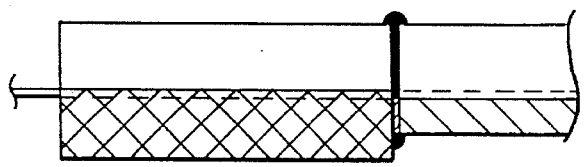
Figure 20:
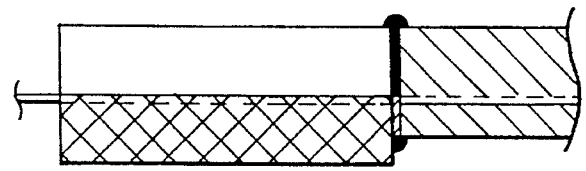
Figure 21:
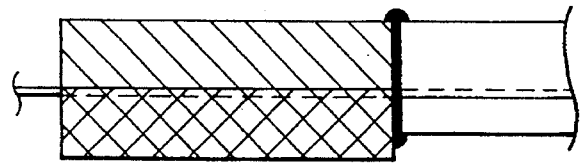
Figure 22:
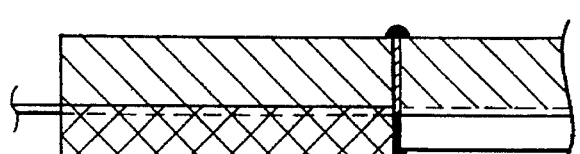
Figure 23:
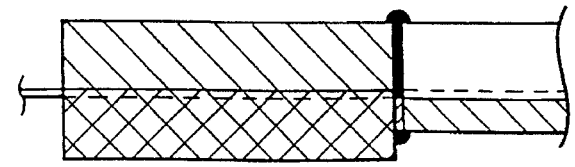

If only the waveguide covering member has light transmission properties, from the viewpoint of the coupling strength of an optical fiber arranging connector and a waveguide device, the area of the end face of the waveguide covering member opposing the optical fiber arranging connector is preferably about ⅓ or more the area of the end face of the waveguide substrate opposing the optical fiber arranging connector (see, e.g., FIGS. 15, 22).

The coupling structure of the present invention relates to a structure in which an adhesive interposed as a film in at least part of a portion between the opposing end faces of an optical fiber arranging connector and waveguide device, can be set. When the shapes of the end faces are changed, the position of the adhesive becomes different accordingly. More specifically, even if a waveguide covering member having light transmission properties is not provided and a fiber arranging substrate and a waveguide substrate are both made of silicon and oppose each other (such a structure is not shown in FIGS. 3 or 4), the coupling structure falls within the scope of the arrangement of the present invention depending on the shape of the end face of the light-transmitting fiber fixing plate (fixing member), as shown in FIGS. 24 to 27.

Figure 24:
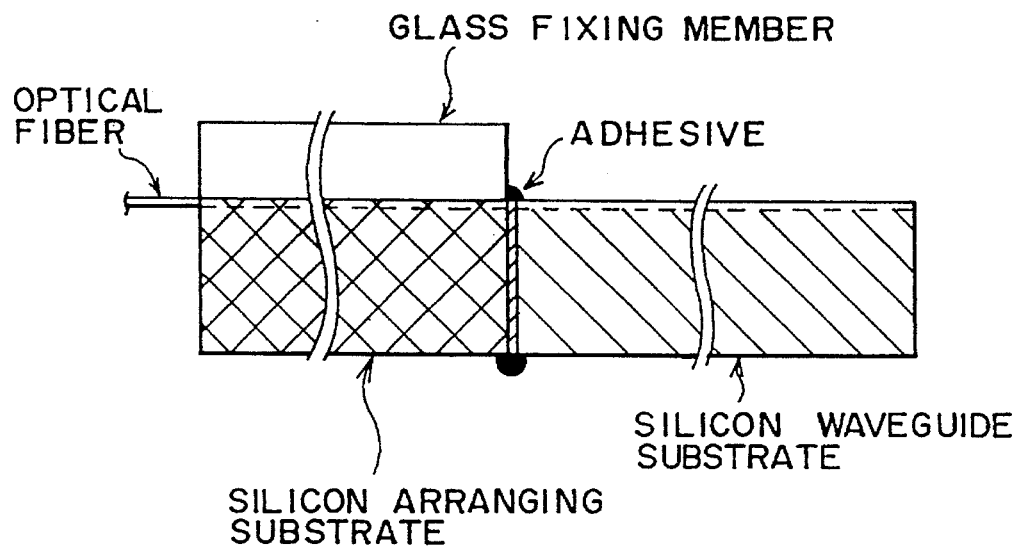
FIG. 24 is a longitudinal sectional view showing the structure of a modification of the coupling structure of the optical fibers and the optical waveguides shown in FIG. 1 in the vicinity of the coupled end faces, in which the end faces of an arranging substrate and a waveguide substrate are adhered to each other.
Figure 25:
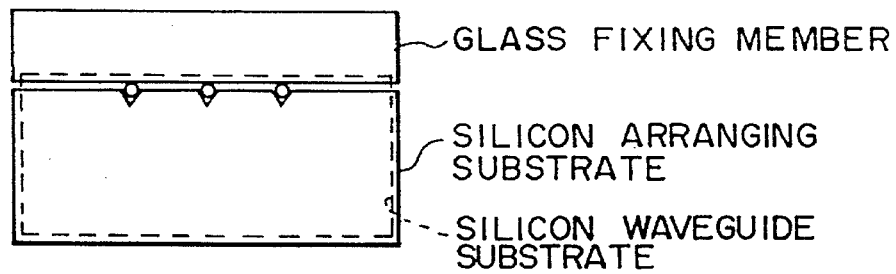
FIG. 25 is a cross-sectional view showing the structure of the coupled end faces, in which the fixing member of FIG. 24 has a flat shape.
Figure 26:
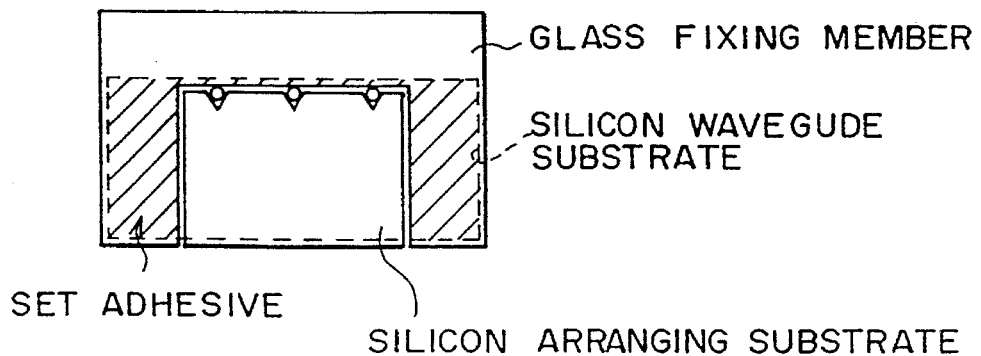
FIG. 26 is a cross-sectional view showing the structure of the coupled end faces, in which the fixing member of FIG. 24 has a U-shaped section.
Figure 27:
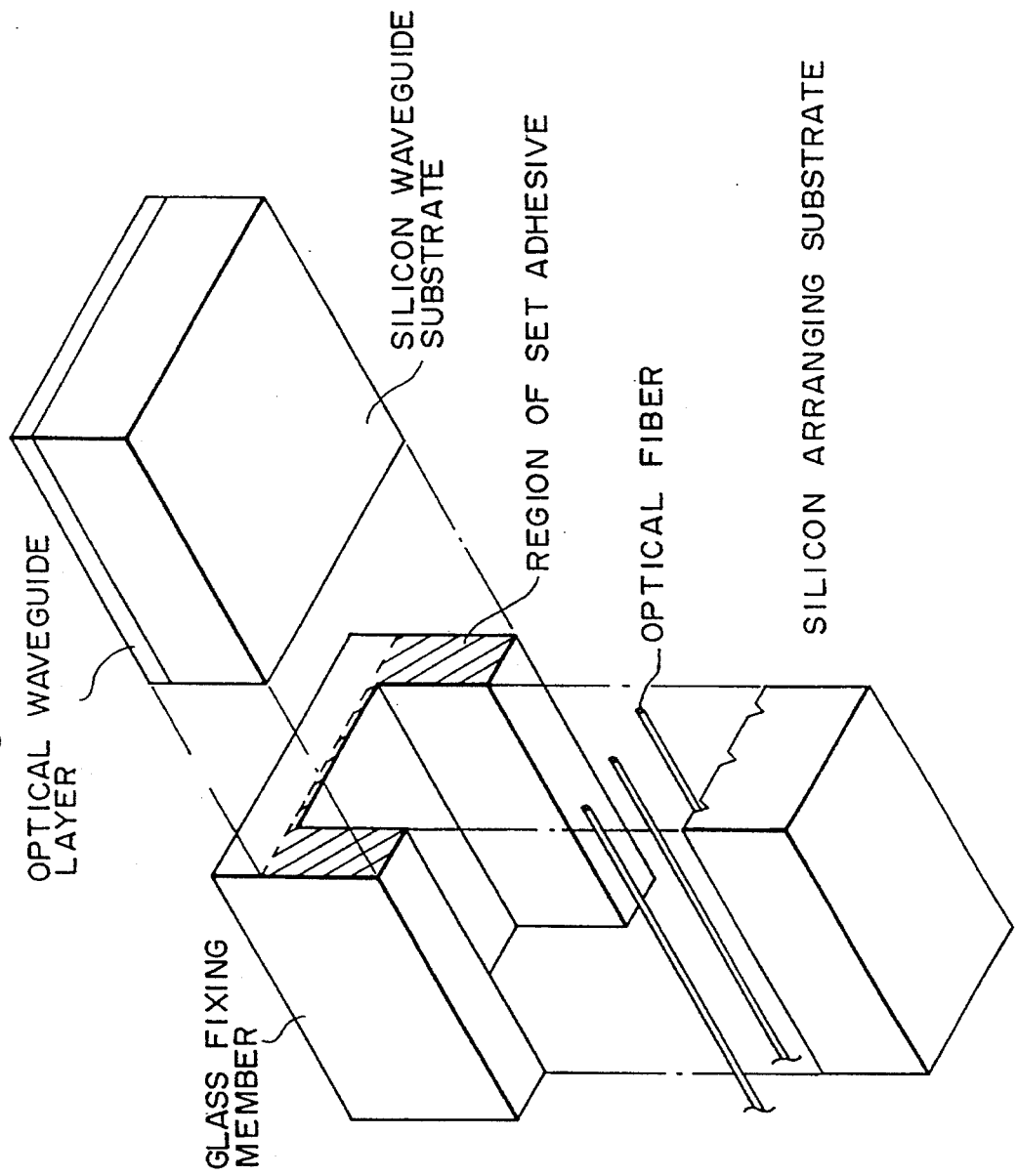
FIG. 27 is a perspective view showing the exploded arrangement of the main part of FIG. 26.

FIG. 24 is a longitudinal sectional view showing the structure of a modification in the vicinity of the coupled end faces, in which the end faces of an arranging substrate and a waveguide substrate are adhered to each other. FIG. 25 is a cross-sectional view showing the structure of the coupled end faces, in which the fixing member of FIG. 24 has a flat shape. FIG. 26 is a cross-sectional view showing the structure of the coupled end faces, in which the fixing member of FIG. 24 has a U-shaped section. FIG. 27 is an exploded perspective view showing the arrangement of the main part of FIG. 26.

As shown in FIG. 25, when the fixing member made of glass has a flat shape, its end face to oppose the silicon waveguide substrate cannot be almost preserved, and the interposed adhesive is set only slightly. However, as shown in FIGS. 26 and 27, when the fixing member made of glass has a U-shaped section, an adhesive interposed in a wide area between the end faces (hatched region in FIG. 26) of the silicon waveguide substrate and the projecting portions of the fixing member is set.

Therefore, various modifications exist regarding the shapes of the end faces of the optical fiber arranging connector and the waveguide device. The coupling structure of the present invention is realized by their combinations.

Figure 28:
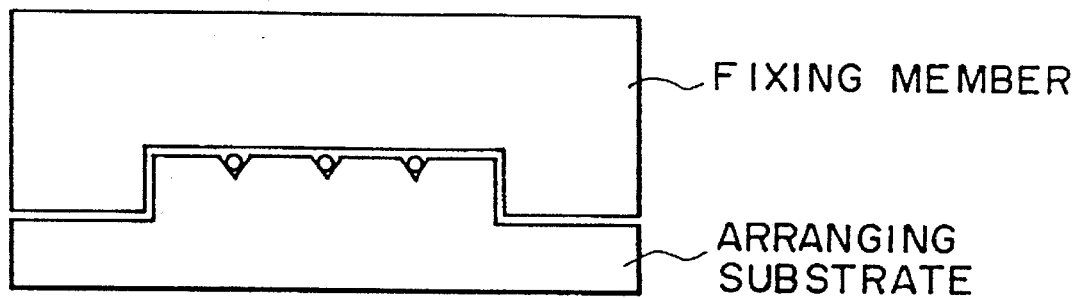
FIGS. 28 to 30 are cross-sectional views showing the structure of the coupled end faces of a modification of the coupling structure of the optical fibers and the optical waveguides shown in FIG. 1, in which the fixing member and the arranging substrate have various shapes.
Figure 29:
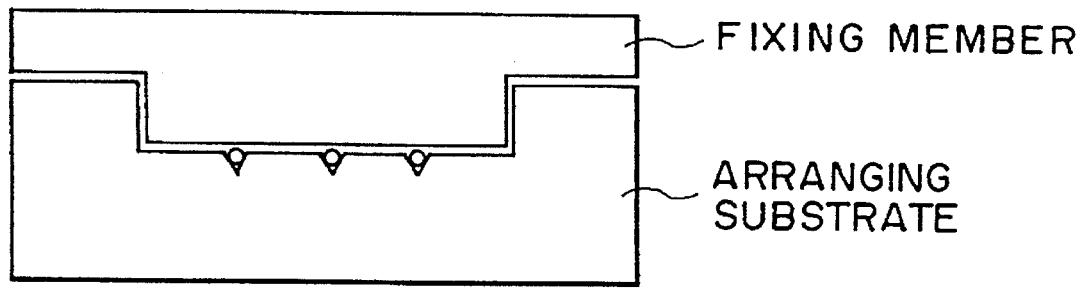
Figure 30:
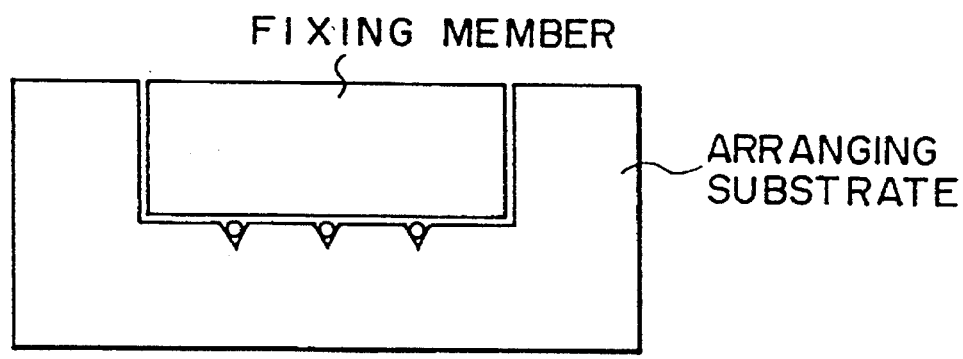

FIGS. 28 to 30 are cross-sectional views showing the structure of the coupled end faces of a modification, in which the fixing member and the arranging substrate have various shapes. In this manner, the end face of the optical fiber arranging connector can have various shapes. The same also applies to a waveguide device.

The adhesive adopted in the present invention may be a photo-setting adhesive and is not limited to the ultraviolet-curing resin described above. For example, a visible light-setting resin which is set upon incidence of visible light can be adopted. Also, a photo-setting/thermosetting adhesive to which a heat-curing catalyst is added in advance can be adopted. As a photo-setting adhesive, the Luxtrak Series (manufactured by ICI Co., U.K.) adhesives are suitable, and especially one marketed as "LCR509A" (tradename) is preferable.

The light-transmitting material that can be adopted in the present invention is not limited to quartz glass containing $SiO_2$ as the major component, but any light-transmitting material can be used as far as it can transmit light having a wavelength capable of setting the photo-setting adhesive as described above. For example, a resin, e.g., polycarbonate (PC) or polymethyl methacrylate (PMMA), whose light absorption edge is at a wavelength of 450 nm or less can be adopted. Especially, the light-transmitting material is preferably a material having a thermal expansion coefficient of less than $6 \times 10^{-5}$ [/K], more preferably $1 \times 10^{-5}$ [/K]. The light-transmitting material is also preferably glass having a thermal expansion coefficient which coincides with that of silicon within the range of ±20%.

In the coupling structure of the present invention, the photo-setting adhesive interposed as a film between the end faces is set by radiating light through a light-transmitting material. Hence, the light-transmitting material to be used must be selected in accordance with the type of adhesive employed.

Figure 31:
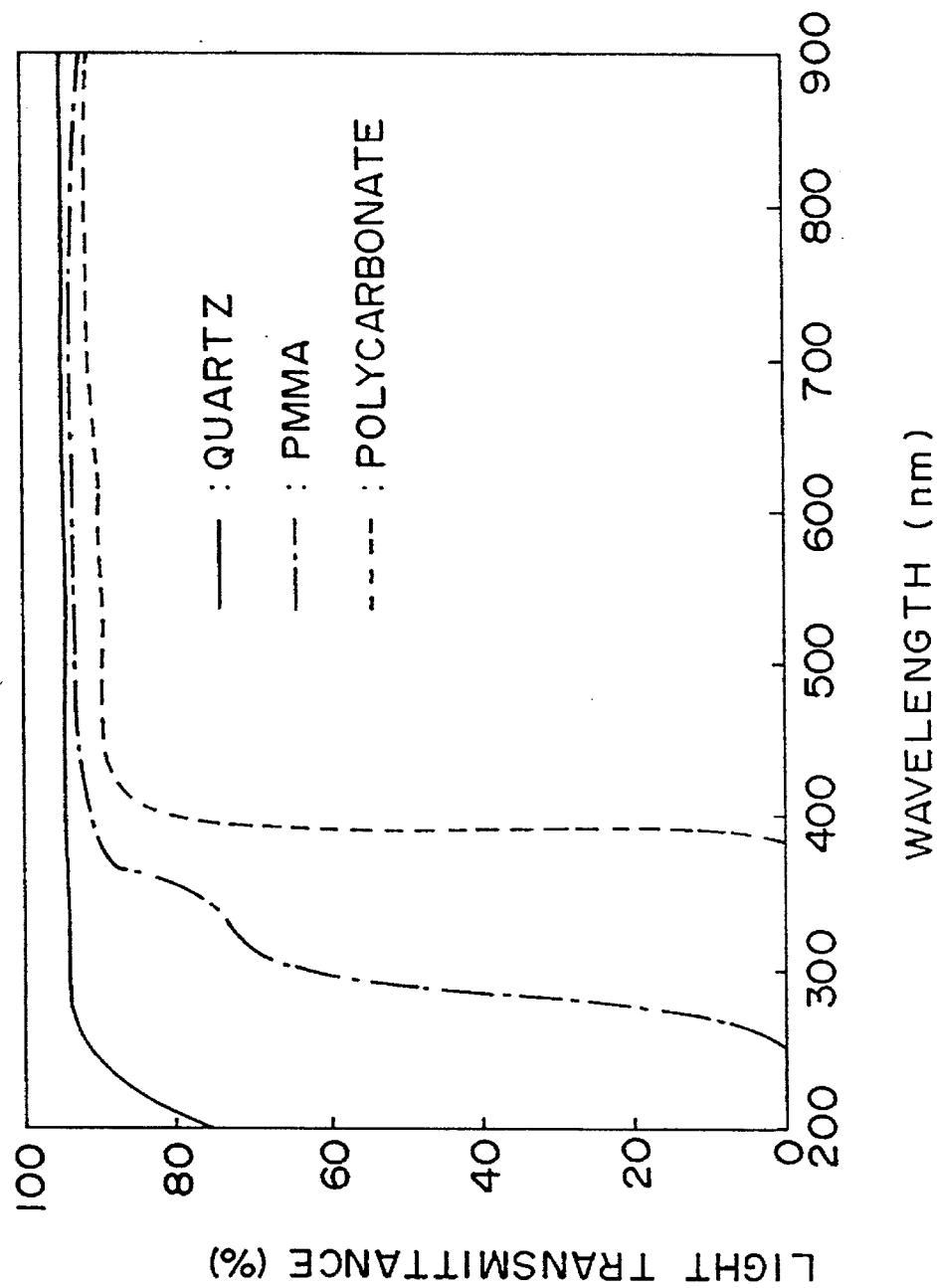
FIG. 31 is a graph showing a relationship between the wavelength of incident light and the light transmittance of each of various types of light-transmitting materials.

FIG. 31 is a graph showing a relationship between the wavelength of incident light and the light transmittance of each of various types of light-transmitting materials. As is apparent from this graph, polycarbonate and PMMA are suitable for setting a visible light-setting resin, and quartz glass is suitable for setting both an ultraviolet-curing resin and a visible light-setting resin.

The fiber arranging substrate that can be adopted in the present invention is not limited to one described above which is made of silicon, but can be made of any material as far as the arranging grooves described above can be easily formed in it. For example, a ceramic material can be adopted if arranging grooves are formed in it during sintering. A plastic material can also be adopted if arranging grooves are formed in it during molding. Especially, a phenol resin containing a filler, a liquid crystal polymer formed as an MID (Molded Interconnection Device), and the like are suitable as the plastic materials. It is preferable that the fiber arranging member is made of a material having a thermal expansion coefficient of less than $6 \times 10^{-5}$ [/K], more preferably $1 \times 10^{-5}$ [/K].

The fiber arranging connector that can be adopted in the present invention is not limited to one which is constituted by sandwiching optical fibers with separately formed fixing member and arranging substrate, as described above, and one which is constituted by forming a resin or the like around optical fibers can be employed by molding.

Figure 32:
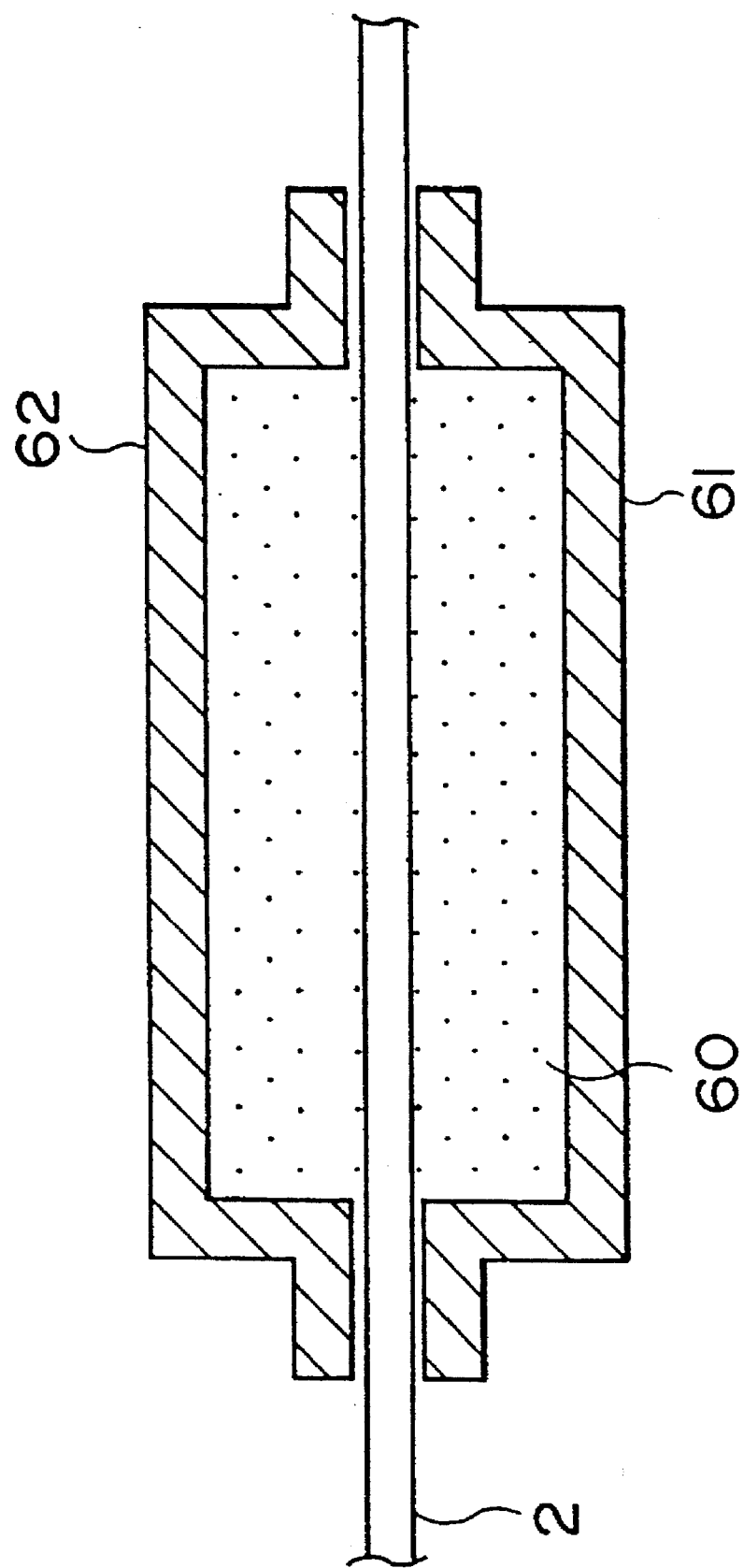
FIG. 32 is a sectional view showing the step of forming a resin or the like around optical fibers in an optical fiber arranging connector by molding.

FIG. 32 is a sectional view showing the step of forming a resin or the like around optical fibers in an optical fiber arranging connector by molding. A plurality of optical fibers extending from a ribbon fiber 2 are arranged parallel to each other at the same interval. Metal die frames 61 and 62 are abutted against each other and fixed so that these optical fibers are inserted in the hollow internal portion defined by them. A resin 60 is injected into the region surrounded by the die frames 61 and 62 and cooled. Subsequently, the die frames 61 and 62 are removed from the optical fibers, and one end face of the resin 60 from which the optical fibers project is mechanically polished. In this manner, an optical fiber arranging connector which is integrally formed by molding is completed.

With the above arrangement, according to the present invention, a coupling structure having very high alignment precision can be realized. Misalignment is one of the major factors that causes a light transmission loss. Especially, in order to connect a single-mode fiber and an optical waveguide with a low loss, alignment is preferably performed with an alignment precision of 0.5 µm or less. This value is determined by also considering factors (misalignment of connected end faces, the distance between the end faces, and the like) other than misalignment, which usually cause a loss.

Figure 33:
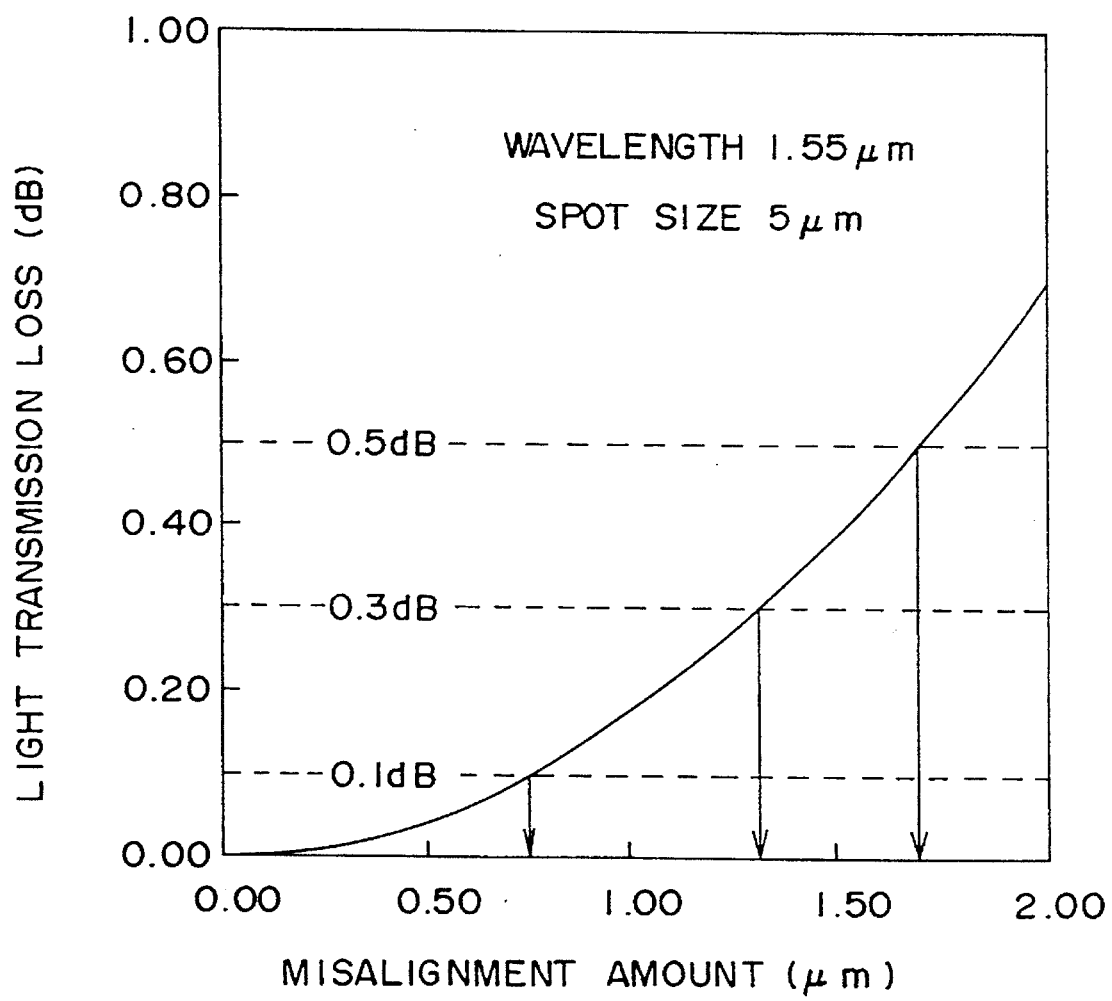
FIG. 33 is a graph showing a relationship between a misalignment amount and a light transmission loss in a coupling structure of a single-mode fiber and an optical waveguide.

FIG. 33 is a graph showing a relationship between a misalignment amount and light transmission loss in a coupling structure of a single-mode fiber and an optical waveguide. It is apparent from this graph that the larger the misalignment amount, the larger the loss.

FIG. 49 is a table showing a thermal expansion character and a light absorption character of various types of materials used in the optical waveguide module. In accordance with this table, Si, $Y—ZrO_2$ of the ceramic material and a phenol resin containing a filler of the plastic material are suitable as a material constituting a fiber arranging substrate for having a comparative low thermal expansion coefficient. $SiO_2$, SD1, SD2 of the glasses containing $SiO_2$ as a major component (goods manufactured by HOYA Co.), PMMA and PC reinforced by glass fibers are suitable as a light transmitting material for having a comparative low thermal expansion coefficient and a light absorption edge positioning at a wavelength of 450 nm or less.

In order to confirm the usefulness and practicality of the coupling structure according to the present invention, the present inventors made coupling structure samples as follows. These coupling structure samples will be described as examples and comparative examples.

EXAMPLE 1

Figure 34:
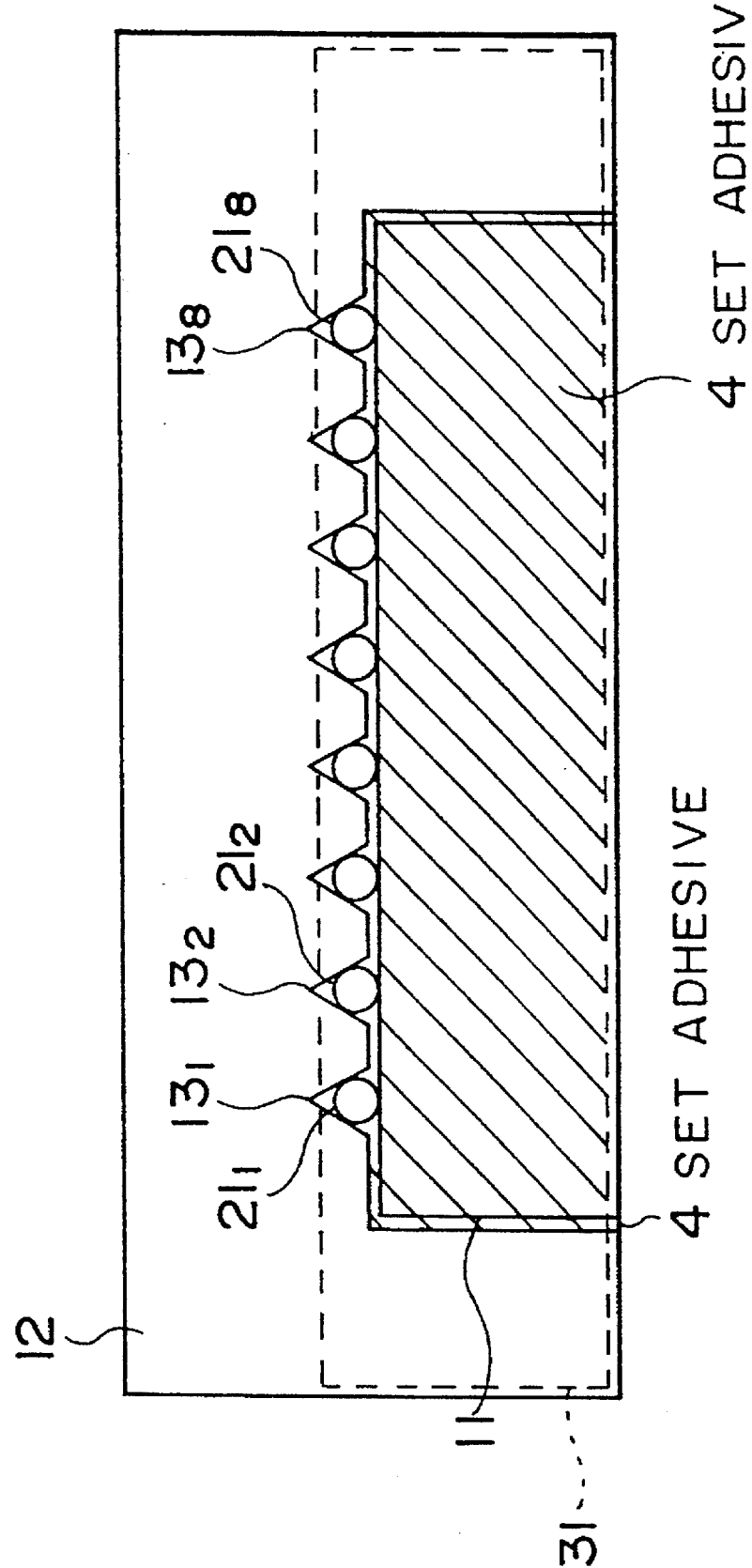
FIG. 34 is a cross-sectional view showing the structure of the coupled end faces of the coupling structure of optical fibers and optical waveguides according to Example 1 of the present invention.

FIG. 34 is a cross-sectional view showing the structure of the coupled end faces of the coupling structure of optical fibers and optical waveguides according to Example 1 of the present invention. Although FIGS. 1 to 4 can be referred to in order to understand the coupling structure of the optical fibers and the optical waveguides of Example 1, the arrangement of the coupling structure of Example 1 is slightly different from that of FIGS. 1 to 4. The end faces of a fiber fixing plate 11 and a fiber arranging substrate 12 have the same shape as those shown in FIG. 30. As shown in FIG. 34, the coupling structure of this example does not have a waveguide covering member, and the end faces of the fiber fixing plate 11 made of quartz glass and a waveguide substrate 31 made of silicon oppose each other. An epoxy-based ultraviolet-curing resin 4 is used as the adhesive, and the fiber arranging substrate 12 is made of silicon.

An optical fiber arranging connector 1 is constituted by the fiber arranging substrate 12 made of silicon and the fiber fixing member 11 made of quartz glass. The fiber arranging substrate 12 is formed with a recessed portion to have a substantially U-shaped section, as shown in FIG. 34, and grooves $13_1$ to $13_8$ having a V-shaped section are formed parallel to each other in the lower surface of the recessed portion. The V-grooves $13_1$ to $13_8$ are continuously formed at once by grinding with a diamond blade to have a depth of 150 μm and a pitch of 250 μm. Eight optical fibers $21_1$ to $21_8$ (having an outer diameter of 125 μm and a core diameter of 50 μm in accordance with CCITT standards) are buried in the V-grooves $13_1$ to $13_8$. The fiber fixing member 11 is fitted under pressure in the recessed portion of the fiber arranging substrate 12 to fix the optical fibers $21_1$ to $21_8$. In this example, the fiber fixing member 11 was adhered to the arranging substrate 12 by using the epoxy-based ultraviolet-curing resin 4. More specifically, the resin is coated on the adhesion surface of the fixing member 11 to be adhered with the fiber arranging substrate 12, and ultraviolet light having a wavelength of 365 nm emerging from a high-pressure mercury lamp was caused to be incident on the adhesive through the quartz glass fixing member 11 and set, thereby adhering the fixing member 11 with the arranging substrate 12. The optical fiber $21_1$ to $21_8$ are arranged in an array in the optical fiber arranging connector 1 obtained in this manner. The end face of the optical fiber arranging connector 1 was shaped by optical polishing so that no misalignment of the coupled end faces will occur without increasing a loss.

A waveguide device 3 is obtained by forming an 8-optical waveguide layer 33 on the silicon waveguide substrate 31. A waveguide covering member is not provided, as described above. The optical waveguide layer 33 is constituted by a cladding layer 35 made of $SiO_2$—$B_2O_3$—$P_2O_5$ glass, and eight optical waveguides $34_1$ to $34_8$ made of $SiO_2$—$GeO_2$—$P_2O_5$—$B_2O_3$ glass, provided at a pitch of 250±0.5 μm, and formed as rectangular prisms having a length of 4 cm (a section of 8×8 μm). These optical waveguides $34_1$ to $34_8$ serve as cores. In this example, the difference in specific refractive index between the cores and the cladding layer was set to 0.3%.

The end faces of the optical fiber arranging connector 1 and the waveguide device 3 are abutted against each other to align the optical fibers $21_1$ to $21_8$ and the waveguide substrates $31_1$ to $31_8$ with each other at once. The epoxy-based ultraviolet-curing resin 4 is injected between the end faces of the optical fiber arranging connector 1 and the waveguide device 3 and set, so that the optical fiber arranging connector 1 and the waveguide device 3 are fixed with each other, thereby forming the coupling structure of the optical fibers and the optical waveguides of this example. In order to promote setting of the film-like adhesive interposed between the end faces, the end face of the fiber fixing member 11 made of quartz glass opposes the end face of the silicon waveguide substrate 31. Ultraviolet light having a wavelength of 365 nm and emerging from the high-pressure mercury lamp was radiated from the peripheral ultraviolet-curing resin portion, thereby setting the ultraviolet-curing resin. Regarding the high-pressure mercury lamp, Toscure 201 (manufactured by Toshiba Raytech) was used as an ultraviolet light source.

The coupling structure of the optical fibers and the optical waveguides of this example includes eight fiber-fitted optical waveguides in which the optical fibers $21_1$ to $21_8$ and the eight optical waveguides $34_1$ to $34_8$ are coupled. When the light transmission loss of the fiber-fitted optical waveguides was measured, the average loss was 0.18 dB. When the ambient temperature of the coupling structure was repeatedly cycled (1 cycle=6 hours) in the range of −10° to 70° C., a fluctuation over time of the loss was stable and small, and the fluctuation value fell within the range of ±0.1 dB. These are both good results. The former result represents the high alignment precision of multi connection of the optical fibers and the optical waveguides of the coupling structure of this example, and the latter result represents a high environmental resistance of the coupling structure of this example.

Figure 35:
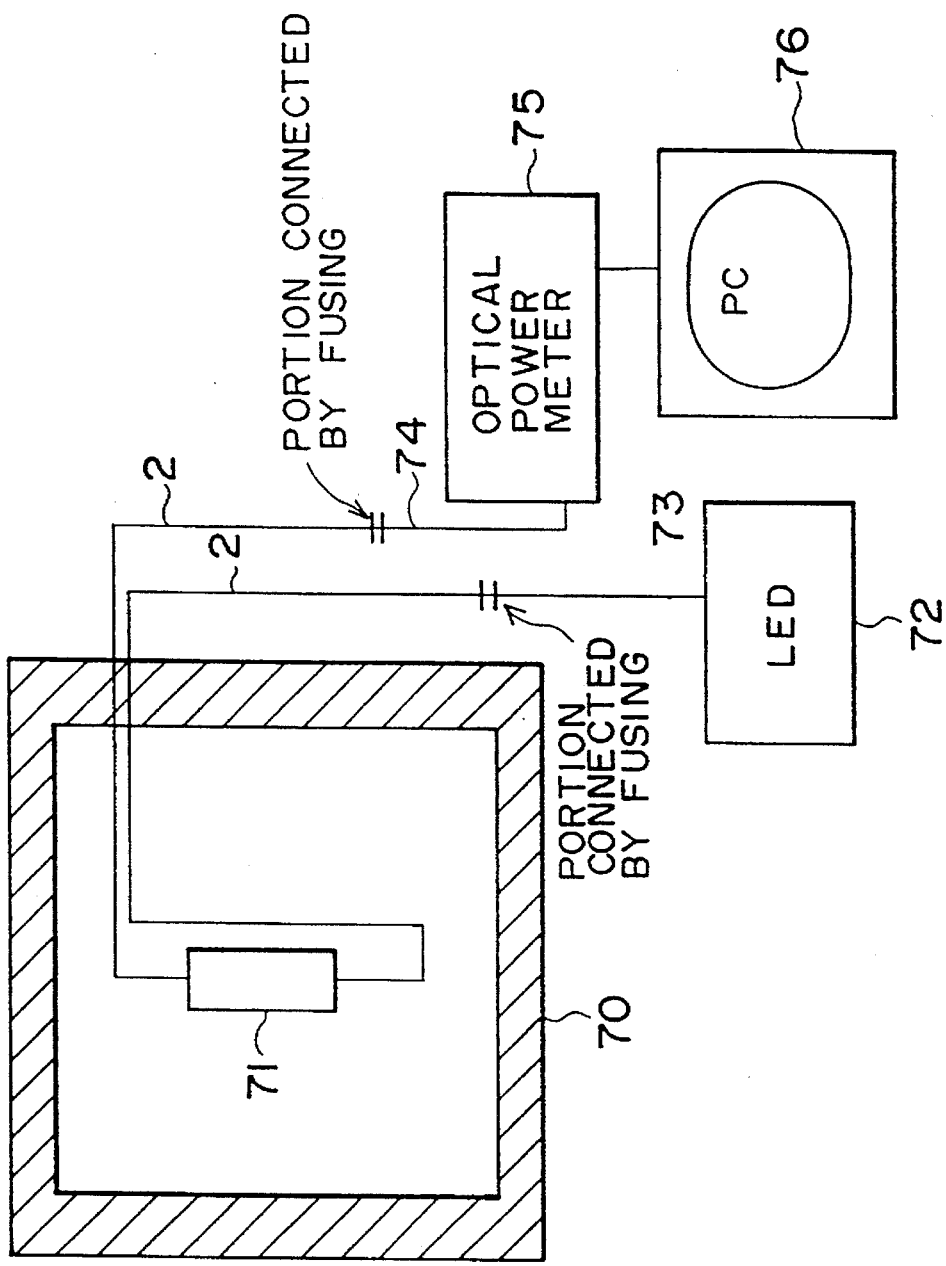
FIG. 35 is a schematic arrangement diagram showing the arrangement of a measuring system that performs a heat cycle test of a coupling structure of optical fibers and optical waveguides.

FIG. 35 is a schematic arrangement diagram showing the arrangement of a measuring system that performs a heat cycle test of a coupling structure of optical fibers and optical waveguides. An optical waveguide module 71 formed in Example 1 is provided in a constant temperature tank 70, and ribbon fibers 2 serving as the input and output portions of the optical waveguide module 71 extend to the outside of the constant temperature tank 70. One ribbon fiber 2 is connected, by fusing, to an optical fiber 73 connected to the light-emitting portion of an LED 72. The other ribbon fiber 2 is connected, by fusing, to an optical fiber 74 connected to the light-receiving portion of an optical power meter 75. The output portion of the optical power meter 75 and the input portion of a PC 76 are electrically connected to each other. With this arrangement, the optical waveguide module 71 as the measurement target is held at a predetermined temperature set in the constant temperature water tank 70. Light emitted from the LED 72 to have a predetermined wavelength is transmitted in the optical waveguide module 71 through the optical fiber 73, and is detected by the optical power meter 75 through the optical fiber 74. A detection signal output from the optical power meter 75 is input to the PC 76 and subjected to a predetermined arithmetic operation, and is displayed on the standard monitor of the PC 76.

Figure 36:
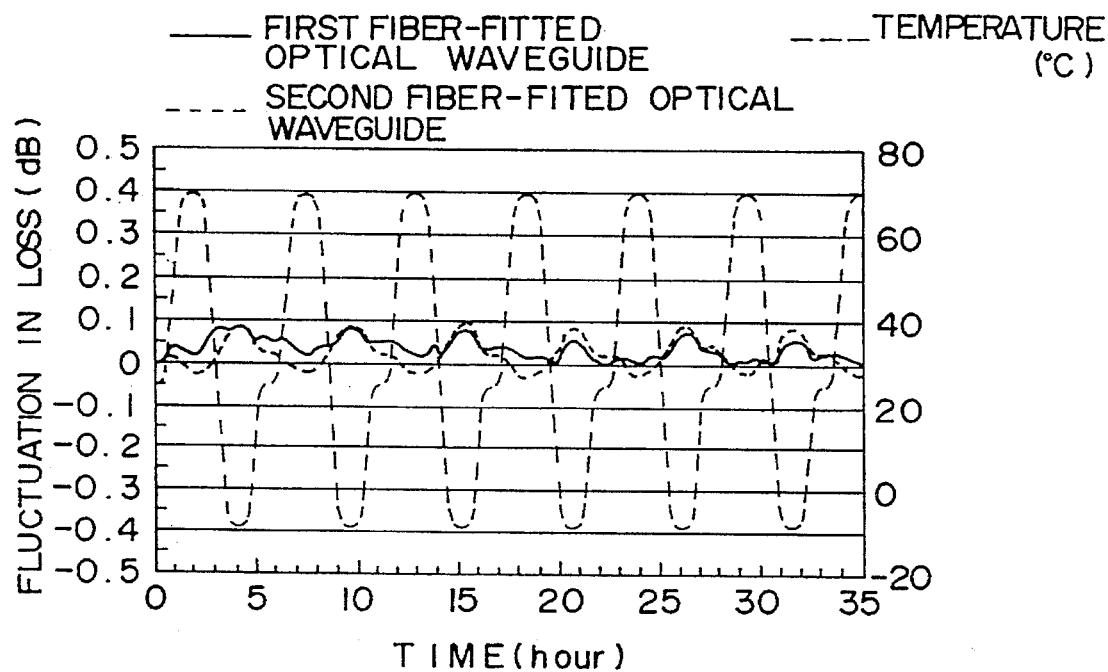
FIG. 36 is a graph showing a fluctuation over time of the light transmission loss of two fiber-fitted optical waveguides which are arbitrarily selected from eight optical waveguides in the coupling structure of the optical fibers and the optical waveguides of Example 1.

FIG. 36 is a graph showing a fluctuation over time of the light transmission loss of two fiber-fitted optical waveguides which are arbitrarily selected from eight optical waveguides in the coupling structure of the optical fibers and the optical waveguides of Example 1.

EXAMPLE 2

In the coupling structure of the optical fibers and the optical waveguides of this example, the type of transmitting material constituting a fiber fixing member 11 is different from that of the coupling structure of Example 1. In this example, polycarbonate as a kind of resin was used as the light-transmitting material. In adhesion of an optical fiber arranging connector 1 and a waveguide device 3, an epoxy-based visible light-setting resin was used as the adhesive, and visible light was caused to be incident on the adhesive through the fiber fixing member 11, thereby setting the adhesive. The epoxy-based visible light-setting resin was also used as an adhesive for adhering the fiber fixing member 11 on a fiber arranging substrate 12. Except for these differences, the arrangement of the coupling structure of the optical fibers and the optical waveguides of this example is the same as that of Example 1.

When the loss of the eight fiber-fitted optical waveguides included in the coupling structure of Example 2 was measured, the average loss was 0.20 dB. When the ambient temperature was subjected to the same temperature cycle as that of Example 1, a result almost the same as that of Example 1 was obtained. More specifically, a fluctuation over time of the loss was stable and small, and fell within the range of ±0.1 dB. These are both good results.

Comparative examples will be described. The coupling structures of the comparative examples to be described hereinafter are similar to that of Example 1 in its arrangement, in the shapes of a fixing member 11, an arranging substrate 2, and a waveguide substrate 31, and in that the fixing member 11 and the waveguide substrate 31 oppose each other. However, Comparative Examples 1 and 2 are different from Example 1 in the materials constituting the fixing member 11 and the arranging substrate 12, respectively. An epoxy-based ultraviolet-curing resin was used as the adhesive in the same manner as in Example 1.

COMPARATIVE EXAMPLE 1

In the coupling structure of optical fibers and optical waveguides of Comparative Example 1, a fiber fixing member 11 is made of silicon, unlike in Examples 1 and 2. Except for this, the coupling structure of Comparative Example 1 is the same as that of Example 1. Accordingly, in the coupling structure of this comparative example, a material, e.g., quartz glass, which transmits ultraviolet rays at a high transmittance is not used.

When the loss of the eight fiber-fitted optical waveguides of the coupling structure of this comparative example was measured, the average loss was 0.25 dB. When the ambient temperature was subjected to the same temperature cycle as that of Example 1 by using the measuring system shown in FIG. 35, the loss fluctuated as time passed.

Figure 37:
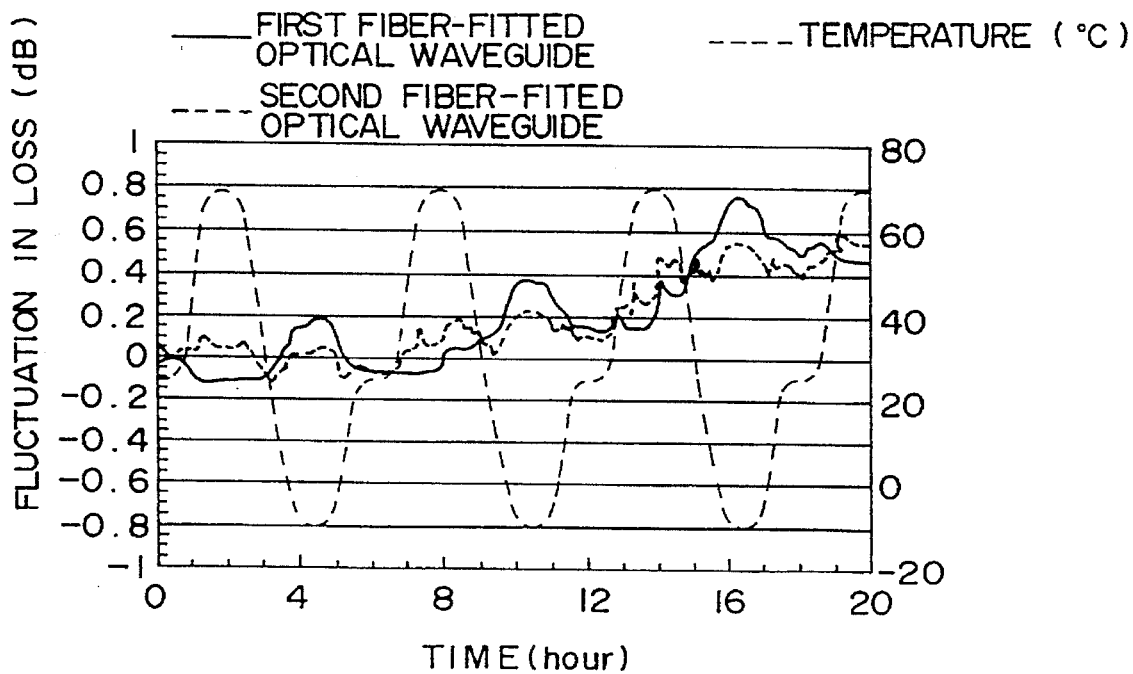
FIG. 37 is a graph showing a fluctuation over time of the light transmission loss of two fiber-fitted optical waveguides which are arbitrarily selected from eight optical waveguides in the coupling structure of the optical fibers and the optical waveguides of Comparative Example 1.

FIG. 37 is a graph showing a fluctuation over time of the light transmission loss of two fiber-fitted optical waveguides which are arbitrarily selected from eight optical waveguides in the coupling structure of the optical fibers and the optical waveguides of Comparative Example 1. These losses tended to increase after each cycle, and an increase in loss exceeding 0.7 dB was observed.

COMPARATIVE EXAMPLE 2

In the coupling structure of optical fibers and optical waveguides of Comparative Example 2, a fiber arranging substrate 11 is made of quartz glass, unlike in Examples 1 and 2. Except for this, the coupling structure of Comparative Example 2 is the same as that of Example 1.

When the loss of the eight fiber-fitted optical waveguides of this coupling structure was measured, the maximum value was as large as 1.25 dB while the minimum value was 0.15 dB, and the average value was 0.52 dB.

As described above, in the coupling structure of Comparative Example 1, since a light-transmitting material, e.g., quartz glass, was not used, ultraviolet light was not sufficiently incident on the ultraviolet-curing resin. Thus, the resin was not sufficiently set, increasing a light transmission loss and decreasing environmental resistance.

In contrast to this, in the coupling structures of Examples 1 and 2, since the end face of the fixing member 11 made of quartz glass and the end face of the waveguide substrate 31 made of silicon oppose each other, the film-like photo-setting adhesive interposed in the vicinity of the coupled end faces of the optical fibers 21₁ to 21₈ and the optical waveguides 34₁ to 34₈ can be easily and reliably set. As a result, a coupling structure having a small light transmission loss and a high environmental resistance, as described in the examples, can be realized.

In the coupling structure of Comparative Example 2, since quartz glass as the light-transmitting material is used as the material of the fiber arranging substrate, the light-transmitting material is sufficiently set. When, however, the processing precision of the V-grooves formed in the arranging substrate was examined, although the V-groove formed first had a depth of 150 µm, the V-groove formed last had a depth of as small as 140 µm. This is due to the wear of the blade caused by the difficult processability of quartz glass. As the processing precision of the V-grooves was poor, the alignment precision was degraded, leading to a loss of as large as 1.25 dB.

In order to improve this, the V-grooves must be formed at high precision. However, with a light-transmitting material, e.g., quartz glass, it is difficult to arrange optical fibers at high positional precision, and the forming operation becomes very cumbersome, thereby prolonging the manufacturing time of the coupling structure.

In contrast to this, in the coupling structures of Examples 1 and 2, since the arranging substrate 12 is made of silicon that can be processed easily, the V-grooves are formed at high positional precision within a short period of time and in accordance with a simple process. Moreover, the multi optical fiber and the multi optical waveguide are aligned at high precision, thereby realizing a coupling structure having a small light transmission loss in the coupled end faces.

As has been clarified through the comparison with the comparative examples, in the coupling structures of the optical fibers $21_1$ to $21_8$ and the optical waveguides $34_1$ to $34_8$ according to Examples 1 and 2 of the present invention, the fiber arranging substrate 12 made of silicon and the fiber fixing member 11 made of a light-transmitting material are provided. Thus, the optical fibers are arranged at high positional precision although the arranging substrate is manufactured in accordance with a systematic short-time process, so that the multi optical fiber and the multi optical waveguide can be aligned with each other at high precision, and the photo-setting adhesive is easily and reliably set. As a result, a coupling structure of optical fibers and optical waveguides which has a small light transmission loss over a long period of time and a high environmental resistance against, e.g., a temperature change, can be realized.

EXAMPLE 3

Figure 38:
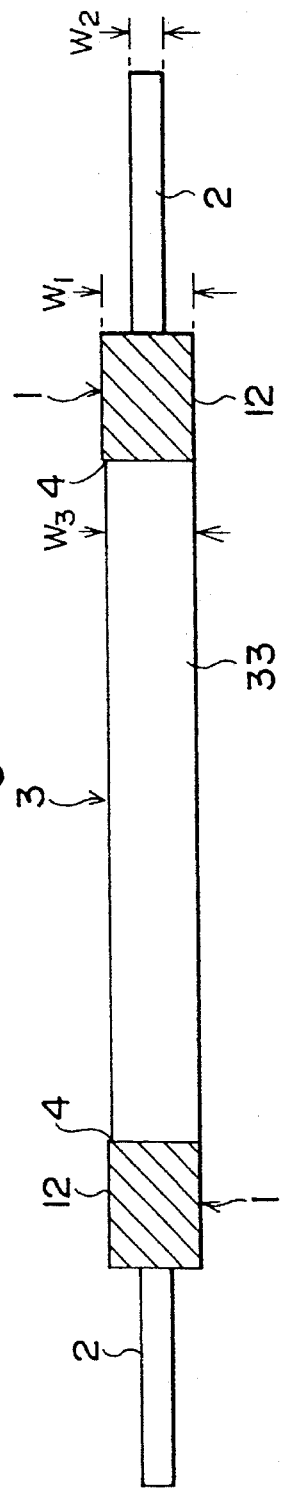
FIG. 38 is a plan view showing the overall arrangement of the coupling structure of optical fibers and optical waveguides according to Example 3 of the present invention.
Figure 39:
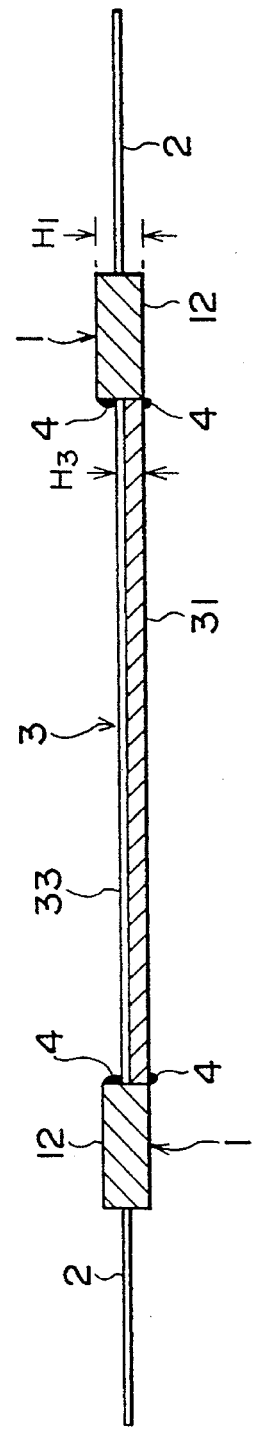
FIG. 39 is a side view of the coupling structure of FIG. 38.
Figure 40:
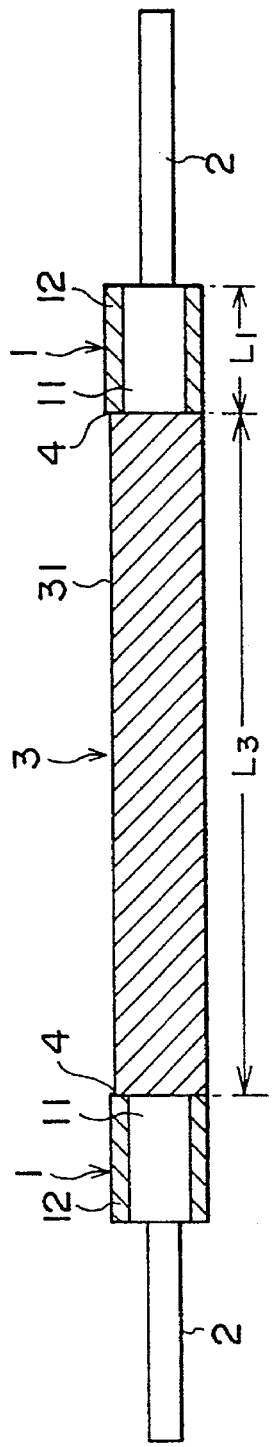
FIG. 40 is a bottom view of the coupling structure of FIG. 38.

FIG. 38 is a plan view showing the overall arrangement of the coupling structure of optical fibers and optical waveguides according to Example 3 of the present invention. FIGS. 39 and 40 are a side view and a bottom view, respectively, of FIG. 38. In the coupling structure of the optical fibers and the optical waveguides of this example, when an optical fiber arranging connector 1 and a waveguide device 3 are to be connected to each other, a photo-setting/thermosetting adhesive 4 is used.

The optical fiber arranging connector 1 is constituted by a fiber arranging substrate 12 made of silicon and a fiber fixing member 11 made of quartz glass. A plurality of arranging grooves having a V-shaped section are formed parallel to each other in the lower surface of the recessed portion formed in the fiber arranging substrate 12 to have a substantially U-shaped section. A plurality of optical fibers extending from a ribbon fiber 2 are buried in the arranging grooves of the fiber arranging substrate 12 and pressed by the fiber fixing member 11 fitted in the recessed portion of the fiber arranging substrate 12. The end faces of the optical fibers are exposed at one end of the optical fiber arranging connector 1.

Regarding the size of the optical fiber arranging connector 1, the length ($L_1$), width ($W_1$), and height ($H_1$) are about 8 mm, 5 mm, and 2 mm, respectively. The ribbon fiber has a width ($W_2$) of about 2.3 mm.

Figure 41:
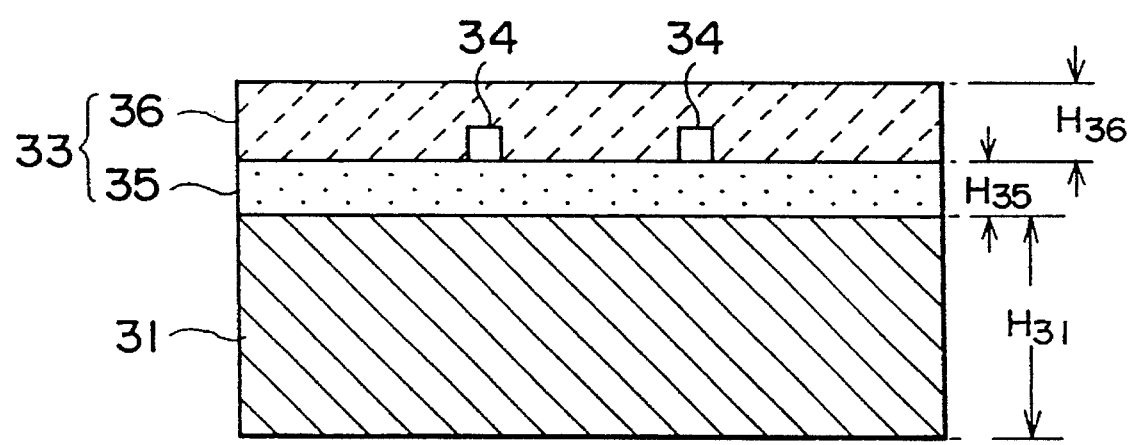
FIG. 41 is a cross-sectional view showing the structure of a waveguide substrate shown in FIGS. 38 to 40.

FIG. 41 is a cross-sectional view showing the structure of the waveguide substrate shown in FIG. 38. This waveguide device 3 is constituted by a waveguide substrate 31 made of silicon and an optical waveguide layer 33 formed on the upper surface of the waveguide substrate 31 by sequentially stacking glass layers in accordance with the flame hydrolysis deposition (FHD) method. The optical waveguide layer 33 has a buffer layer 35 formed on the waveguide substrate 31 as a cladding layer, a plurality of optical waveguides 34 formed on the upper surface of the buffer layer 35 as core layers, and a protection layer 36 formed to cover the buffer layer 35 and the optical waveguides 34. The optical waveguides 34 are formed in accordance with reactive ion etching (RIE) method as linear or branching buried cores having a core diameter of 8 μm and a difference in specific refractive index of 0.3%. One end face of each optical waveguide 34 is exposed at one end of the waveguide device 3 as an input portion on which light is incident, and the other end face of each optical waveguide 34 is also exposed at the other end of the waveguide device 3 as an output portion for causing light to emerge therefrom.

Figure 42:
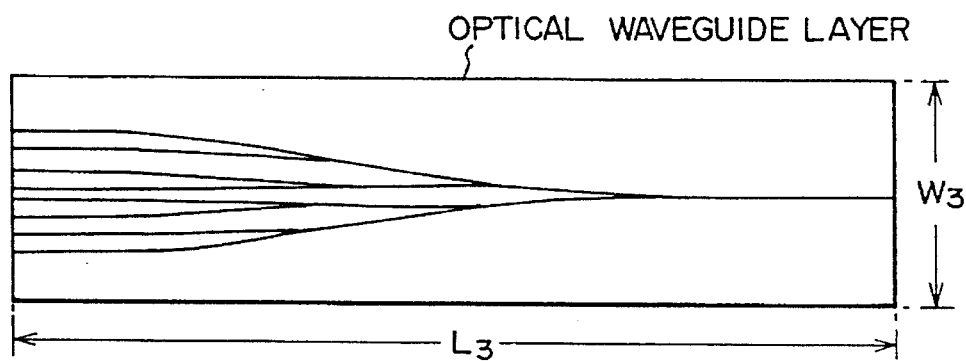
FIGS. 42 to 44 are plan views showing the arrangement of an optical waveguide layer in the waveguide substrate shown in FIGS. 38 to 40.
Figure 43:
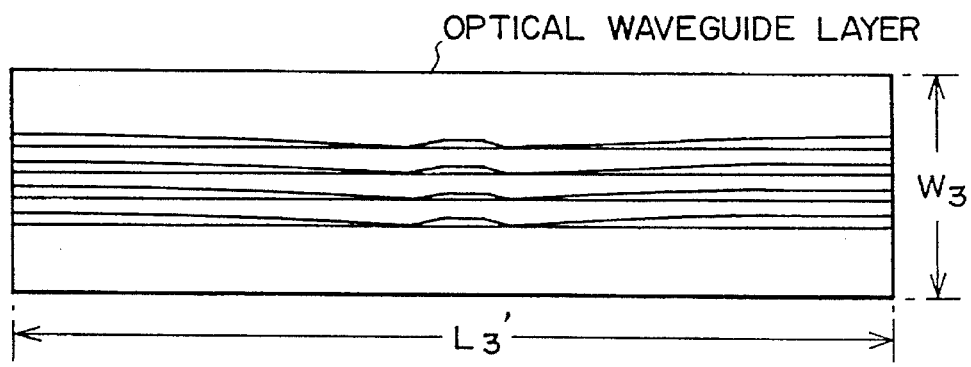
Figure 44:
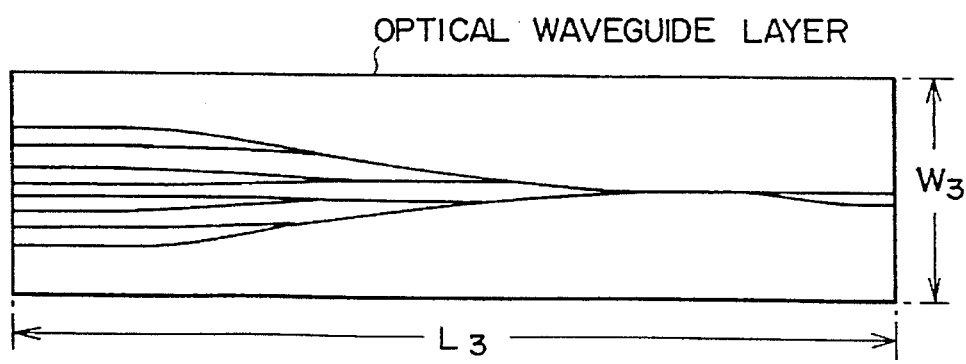

FIGS. 42 to 44 are plan views showing the arrangement of an optical waveguide layer in the waveguide substrate shown in FIG. 38. The optical waveguides 34 can have various types of structures. For example, an 8-branching element type optical waveguide as shown in FIG. 42, a 4-circuit integration type optical waveguide having 2×2-branching elements as shown in FIG. 43, and a 2×8-branching element type optical waveguide as shown in FIG. 44 are practical.

Regarding the size of the waveguide device 3, the length ($L_3$), width ($W_3$), and height ($H_3$) are about 40 mm, 5 mm, and 1.1 mm, respectively. More specifically, the thicknesses $H_{31}$, $H_{35}$, and $H_{36}$ of the waveguide substrate 31, buffer layer 35, and protection layer 36 are about 1 mm, 30 μm, and 40 μm, respectively. Both the width and thickness of the optical waveguides 34 are about 8 μm. Especially, the length ($L_3'$) of the waveguide device 3 shown in FIG. 43 which has the optical waveguide layer 33 constituted as a 4-circuit integration type optical waveguide having 2×2-branching elements is about 25 mm.

The end face of the optical fiber arranging connector 1 and the end face of the waveguide device 3 are adhered to each other by polymerization through the photo-setting/thermosetting adhesive 4 to be described later. In accordance with polymerized adhesion, the optical fiber arranging connector 1 and the waveguide device 3 are arranged such that the optical axes of the optical fibers of the optical fiber arranging connector 1 and the optical axes of the optical waveguides of the waveguide device 3 coincide with each other. One or two optical fiber arranging connector 1 and the waveguide devices 3 constitute an optical waveguide module.

The photo-setting/thermosetting adhesive 4 comprises an epoxy-based photo-setting adhesive having a high adhesion strength and suitable for use in a wide temperature range. A heat-curing catalyst is added to the epoxy-based photo-setting adhesive in advance. This is due to the following reason. If only a thermosetting adhesive is used, the optical axes of the optical fibers of the optical fiber arranging connector 1 and the optical axes of the optical waveguides of the waveguide device 3 are misaligned during setting. The heat-curing catalyst is added to the epoxy-based photo-setting adhesive to prevent this misalignment. More specifically, since the thermosetting resin requires a long time of 30 minutes to 12 hours to set, the optical axes of the optical fibers of the optical fiber arranging connector 1 and the optical axes of the optical waveguides of the waveguide device 3 can be undesirably misaligned during setting.

Figure 45:
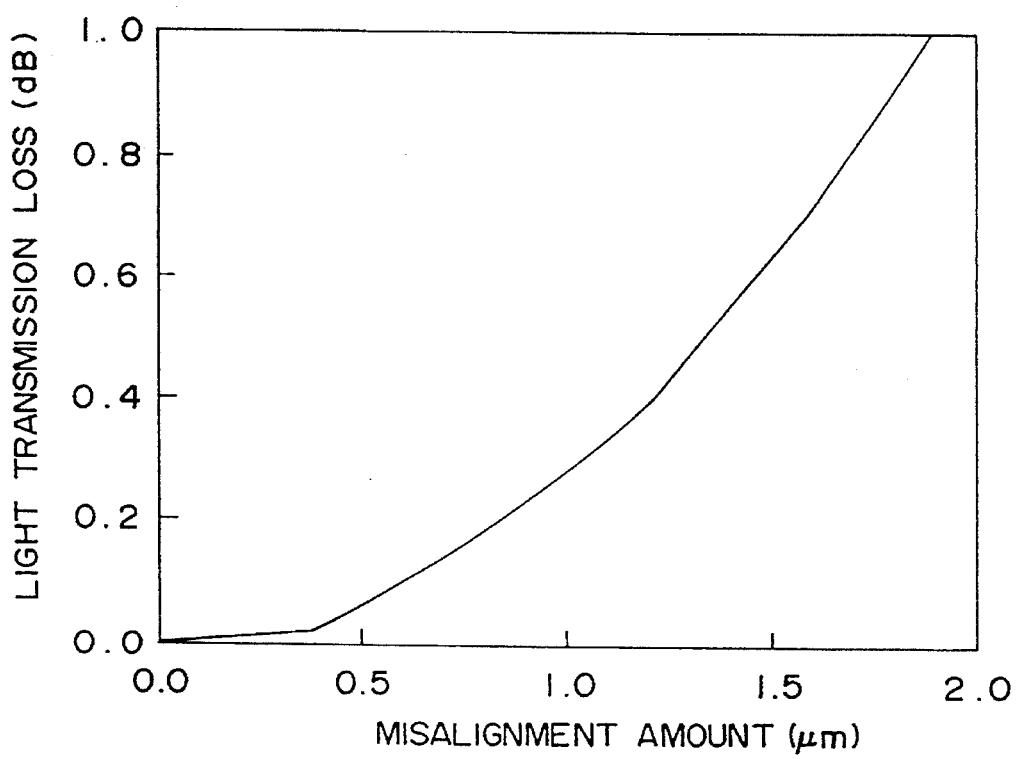
FIG. 45 is a graph showing a theoretical relationship between a misalignment amount and a light transmission loss in the coupling structure of optical fibers and optical waveguides.

FIG. 45 is a graph showing a theoretical relationship between a misalignment amount and a light transmission loss in the coupling structure of optical fibers and optical waveguides. It is apparent from this graph that the larger the misalignment amount, the larger the light transmission loss.

In order to prevent this, a photo-setting initiator and a thermosetting initiator are contained in the adhesive 4. A peripheral portion of the photo-setting/thermosetting adhesive 4 is set during a short period of time (1 to 15 minutes) by light radiation. Thereafter, a portion not irradiated with light is set by heat (30 minutes to 12 hours). Thus, the photo-setting/thermosetting adhesive 4 is substantially and finally set and fixed, thereby connecting and fixing the optical fiber arranging connector 1, on which the optical fibers extending from the ribbon fiber 2 are arranged and fixed, and the waveguide device 3 with each other. The setting initiators in the photo-setting/thermosetting adhesive 4 are components that form radicals when irradiated with light or heated and promote a polymerization reaction of the monomer and/or the oligomer of the major component of the photo-setting/thermosetting adhesive 4. Therefore, it is preferable that the setting initiators are added in the photo-setting/thermosetting adhesive 4 in at least an amount that can cause a setting reaction at 90% or more even with each component.

To add the setting initiators excessively must be avoided because, if they are excessively added, they are left in the photo-setting/thermosetting adhesive 4 to decrease the adhesion strength. Thus, it is preferable that 0.5 wt % or more and less than 5.0 wt % of the photo-setting initiator and of the thermosetting initiator are contained in the adhesive 4. If the addition amount of each agent is less than 0.5 wt %, the setting reaction does not proceed sufficiently, a non-set component is left after the setting process, and the adhesion strength is decreased. Then, a fluctuation of the loss can be caused easily by an environmental change (e.g., temperature and mechanical impact). If the addition amount of each agent is 5.0 wt % or more, a decrease in adhesion strength caused by the remaining setting initiator becomes a problem, as in the case wherein the addition amount is small.

The photo-setting initiator and the thermosetting initiator of the epoxy-based adhesive are described on, e.g., Table 1–6 (pp. 218), Table 1–7 (pp. 219), and Table 2–4–5 (pp. 577) in "Practical Plastic Dictionary" published by K. K. Sangyo Chosa Kai, 1993. As the photo-setting/thermosetting adhesive, Three Bond 3000 and 3100 Series (manufactured by Three Bond Co., Japan) adhesive are suitable, and especially those marketed as "3042", "3102", "3103", "3112", and "3113" (tradenames) are preferable.

Hence, to mount the optical fibers of the optical fiber arranging connector 1 in the optical waveguides of the waveguide device 3, the optical fibers of the optical fiber arranging connector 1 and the optical waveguides of the waveguide device 3 are aligned. Subsequently, the photo-setting/thermosetting adhesive 4 is applied to the end face of an optical fiber arranging connector 1, on which input optical fibers are arranged, to oppose the end face of the waveguide device 3 serving as the input portion and also on the end face of the other optical fiber arranging connector 1, on which output optical fibers are arranged, to oppose the end face of the waveguide device 3 serving as the output portion (see FIG. 39).

When application of the adhesive 4 is completed in this manner, ultraviolet light (high-pressure mercury lamp, 365 nm) is externally radiated to a peripheral portion (near the joint portion) of the adhesion surface on which the photo-setting/thermosetting adhesive 4 is coated, at an intensity of 10 mW/cm$^3$ for 200 seconds, to photo-set the adhesive 4.

Thereafter, the optical module is heated at 80° C. for 10 hours to thermoset the adhesive 4, thereby substantially and finally setting and fixing the photo-setting/thermosetting adhesive 4. The optical fibers of the optical fiber arranging connector 1 and the optical waveguides of the waveguide device 3 can be mounted and fixed. The loss of the input and output optical fibers including the respective connecting portions was 0.31 dB after thermosetting was completed, and a reflection attenuation amount was −45 dB.

Figure 46:
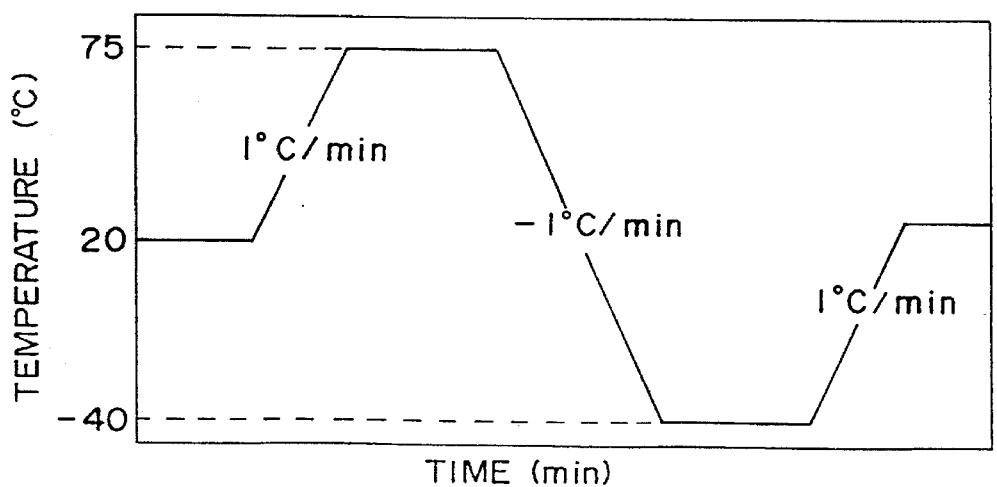
FIG. 46 is a graph showing a change over time in preset temperature in a heat cycle test conducted for a coupling structure of optical fibers and optical waveguides of Example 3.

FIG. 46 is a graph showing a change over time in preset temperature in a heat cycle test conducted for the coupling structure of the optical fibers and the optical waveguides of Example 3. When the loss fluctuation of this optical waveguide module in the temperature cycle of −40° C. to −75° C. was measured, a difference in loss between the maximum and minimum values was 0.08 dB, which is a very good result.

COMPARATIVE EXAMPLE 3

In order to explain the effect of the present invention from a comparative viewpoint, a method of mounting the optical fibers of an optical fiber arranging connector 1 and the optical waveguides of a waveguide device 3 by using a simple epoxy-based photo-setting adhesive, to which a heat-curing catalyst is not added unlike in Example 3, will be described. The optical waveguide module of this comparative example has the same structure as that of Example 3.

In this comparative example, the optical fibers of the optical fiber arranging connector 1 and the optical waveguides of the waveguide device 3 are aligned. Subsequently, an epoxy-based photo-setting adhesive is applied to the end face of the optical fiber arranging connector 1, on which input optical fibers are arranged, to oppose the end face of the waveguide device 3 serving as the input portion, and also on the end face of the other optical fiber arranging connector 1, on which output optical fibers are arranged, to oppose the end face of the waveguide device 3 serving as the output portion.

When application of the adhesive is completed in this manner, ultraviolet light (high-pressure mercury lamp, 365 nm) is externally radiated to a peripheral portion of the adhesion surface on which the epoxy-based photo-setting adhesive is coated, at an intensity of 10 mW/cm$^3$ for 200 seconds, to photo-set the adhesive 4, thereby mounting and fixing the optical fibers of the optical fiber arranging connector 1 and the optical waveguides of the waveguide device 3.

The loss of the input and output optical fibers including the respective connecting portions was 0.31 dB, and a reflection attenuation amount was −45 dB. When the loss fluctuation of this optical waveguide module in the temperature cycle of −40° C. to −75° C. was measured in the same manner as in Example 3, a difference in loss between the maximum and minimum values was 0.45 dB, indicating a very large fluctuation.

According to the method shown in Example 3, ultraviolet light is radiated on the peripheral portion of the adhesion surface on which the photo-setting/thermosetting adhesive 4 is coated, to photo-set the adhesive 4, and thereafter the optical module is heated to thermoset the adhesive 4, thereby substantially and finally setting and fixing the fiber fixing member 11. Thus, both the optical fiber arranging connector 1 and the waveguide device 3 need not be made of a material having light transmission properties. Accordingly, when silicon which does not have light transmission properties is used as the material of the waveguide substrate 31 to which a manufacturing method represented by the FHD method is applied, a drawback in that the material of the optical fiber arranging connector 1 is limited to a light-transmitting material can be reliably eliminated. Furthermore, since the optical fiber arranging connector 1 and the waveguide device 3 need not be respectively fixed in metal housings, the drawback of very expensive fixing scheme can be easily eliminated.

EXAMPLE 4

Figure 47:
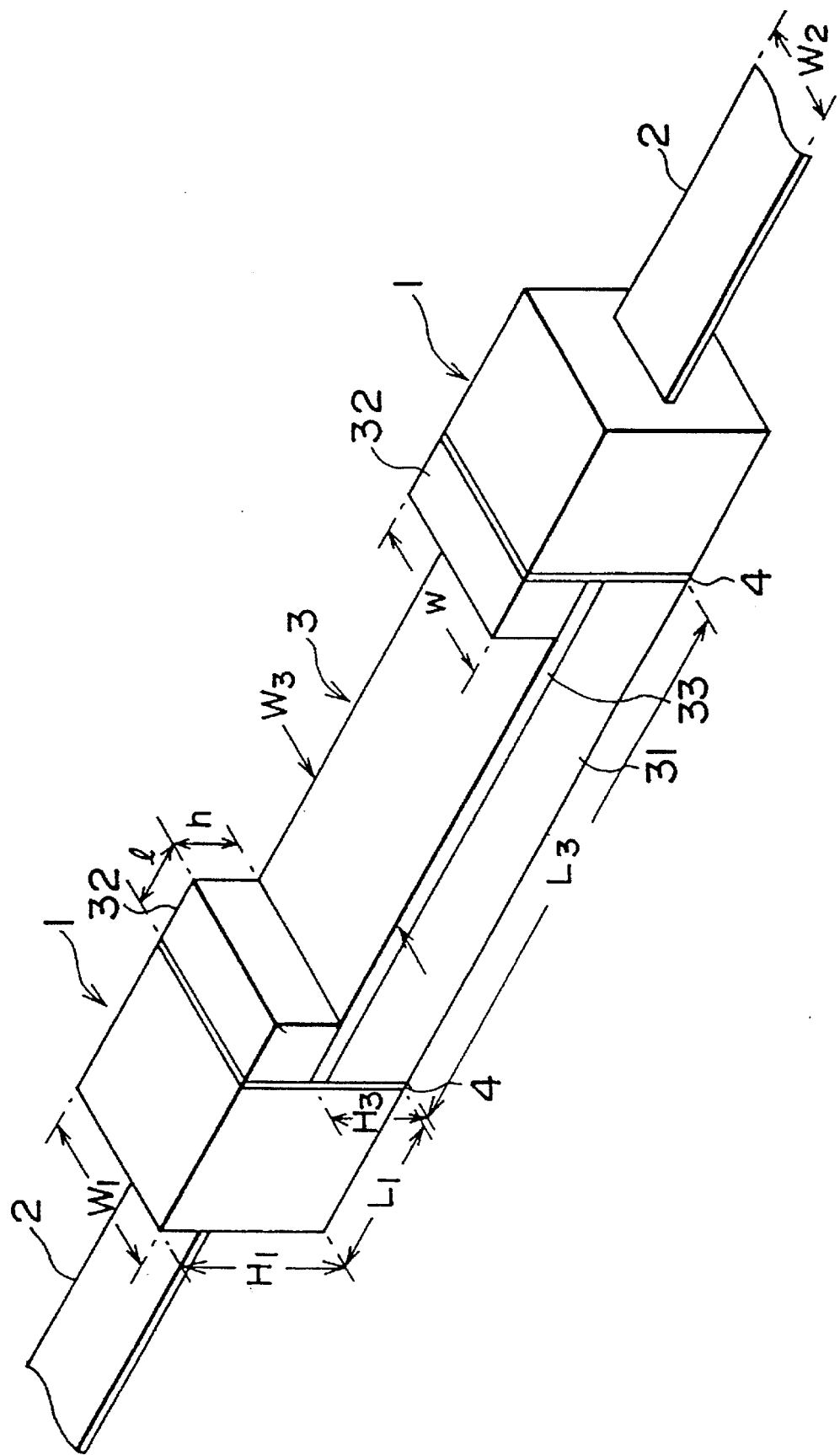
FIG. 47 is a perspective view showing the overall arrangement of a coupling structure of optical fibers and optical waveguides according to Example 4 of the present invention.

FIG. 47 is a perspective view showing the overall arrangement of a coupling structure of optical fibers and optical waveguides according to Example 4 of the present invention. In this case, in an optical fiber arranging connector 1, silicon is used as the material of a fiber arranging substrate 12 and a fiber fixing member 11. In a waveguide device 3, waveguide covering members 32 are respectively placed on the two end portions of the upper surface of a waveguide substrate 31 through an epoxy-based photo-setting adhesive 4.

The waveguide covering members 32 are made of glass plates of SiO$_2$ which is a light-transmitting material, and their end faces are polished to constitute the same planes as the end faces of the waveguide substrate 31. The waveguide covering members 32 are adhered and placed on the two ends of the upper surface of the waveguide substrate 31 and the upright surface portions of the corresponding optical fiber arranging connectors 1 through the epoxy-based photo-setting adhesive, in order to suppress a fluctuation in loss during thermosetting. The end faces of the waveguide covering members 32 are polished to constitute the same planes with the end faces of the waveguide substrate 31, and the waveguide covering members 32 are adhered to the waveguide substrate 31 before mounting the optical fibers of the optical fiber arranging connectors 1 and the optical waveguides of the waveguide device 3, because otherwise the loss tends to fluctuate due to setting shrinkage of the adhesive 4 during photo-setting. Other portions of the coupling structure are the same as that of Example 3.

Each waveguide covering member 32 is rectangularly formed to have a length (l), width (w), and height (h) of about 5 mm, 5 mm, and 1 mm, respectively, and its end face opposing the corresponding optical fiber arranging connector 1 has a sectional area of about 5 mm$^2$.

FIG. 48 is a table showing a fluctuation in light transmission loss obtained after the adhesive is photo-set and after the adhesive is thermoset in a coupling structure of the optical fibers and the optical waveguides shown in FIG. 47. It is apparent that in this example the same function and effect as those of Example 3 can be expected. A photo-setting/thermosetting adhesive 4 identical to that described in Example 3 was used in the optical waveguide module, and a fluctuation in loss after the adhesive is fixed by ultraviolet ray radiation and after the adhesive is fixed by thermosetting was examined. It was confirmed that the fluctuation was suppressed to as very small as 0.02 dB. When the waveguide covering members 32 were omitted, the fluctuation in loss before and after the thermosetting process was as large as 0.15 dB. In this example, the waveguide covering members 32 made of SiO$_2$ glass plates were employed. Almost the same function and effect were obtained even when waveguide covering members 32 made of SiO$_2$—Na$_2$O—Al$_2$O$_3$-based glass were employed.

In Examples 3 and 4, the epoxy-based photo-setting adhesive to which the heat-curing catalyst was added in advance was used as the photo-setting/thermosetting adhesive. However, even if an adhesive, e.g., an acrylate-based adhesive to which a heat-curing catalyst is added in advance, having the same function is used, the same function and effect as those of the above examples can be obtained. In Examples 3 and 4, the optical fiber arranging connector obtained by forming the V-grooves in the silicon fiber arranging substrate was used. However, even if a fiber arranging substrate made of a plastic is employed, the same function and effect as described above can be obtained. In Example 4, the waveguide covering members each having a sectional area of about 5.0 mm² opposing the end face of the fiber arranging connector were employed. However, the same function and effect can be obtained if each waveguide covering member has a sectional area of 1.0 mm² or more.

As has been described above in detail, according to the coupling structure of the optical fibers and the optical waveguides of the present invention, the first member constituting the optical fiber arranging connector is made of a material, e.g., silicon that can be processed easily, which does not transmit light having a wavelength capable of setting the adhesive. Thus, the arranging grooves of the optical fibers can be formed in the first member in accordance with a simple process at high positional precision within a short period of time. In part of the region where the end faces oppose each other, a portion of at least one of the optical fiber arranging connector and the waveguide device in the vicinity of its end face is made of a light-transmitting material that can transmit light having a wavelength capable of setting the adhesive. Thus, the thin film of the photo-setting adhesive interposed between the end faces is easily and reliably set over a wide area by light radiation through the light-transmitting portion made of the light-transmitting material.

Therefore, a multi optical fiber and a multi optical waveguide are aligned with each other in accordance with the systematic, short-time manufacturing process at high precision to decrease the light transmission loss, and this aligned state of the optical fibers and the optical waveguides can be stably maintained over a long period of time, thereby realizing a coupling structure of the optical fibers and optical waveguides which has a high environmental resistance.

When the optical waveguides of the waveguide device and the optical fibers of the optical fiber arranging connector are aligned with each other and subsequently the end face of the optical fiber arranging connector is adhered by polymerization to the end face of the waveguide device with a photo-setting/thermosetting adhesive, if light is radiated to the peripheral portion of the adhesion surfaces coated with the adhesive with a predetermined intensity for a predetermined period of time, thereby photo-setting the adhesive, and thereafter the optical waveguide module is heated at a predetermined temperature for a predetermined period of time, thereby thermosetting the adhesive. The adhesive is substantially and finally set and fixed. Thus, the optical waveguides and the optical fibers can be properly mounted and firmly fixed with each other.

Furthermore, when the waveguide device has a waveguide covering member that covers the optical waveguide forming surface on the waveguide substrate, if the waveguide covering member made of a light-transmitting material is provided in advance to part of the connection region of the optical fiber arranging connector and the waveguide device to have a sectional area of 1.0 mm² or more, this waveguide covering member fixes part of the adhesion surface which is not completely fixed during photo-setting. As a result, a fluctuation in loss during the thermosetting reaction is largely suppressed.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 174,393/1993 filed on Jul. 14, 1993 and No. 11015/1994 filed on Feb. 2, 1994 are hereby incorporated by reference.

What is claimed is:

1. A coupling structure for optical fibers and optical waveguides, comprising:

optical fibers;

an optical fiber arranging connector having a first and second member, said optical fibers being sandwiched by said first and second members to be fixed in said optical fiber arranging connector;

a waveguide device having a waveguide substrate, optical waveguides being formed on a surface portion of said waveguide device;

a photo-curable adhesive interposed and cured between an end face of said optical fiber arranging connector and an end face of said waveguide device which abut each other;

said first member being made of a material preventing light having a wavelength capable of curing said adhesive from passing therethrough; and a part of at least one of said second member and said waveguide device being made of a light-transmitting material through which light having a wavelength capable of curing said adhesive can pass, whereby external light reaches to at least one part of said interposed adhesive to cure said interposed adhesive.

2. A coupling structure according to claim 1, wherein said light-transmitting material is a material has a thermal expansion coefficient of less than $1\times10^{-6}$ [/K].

3. A coupling structure according to claim 2, wherein said light-transmitting material is glass containing $SiO_2$ as a major component.

4. A coupling structure according to claim 3, wherein said light-transmitting material is glass having a thermal expansion coefficient substantially the same as that of silicon within a range of ±20%.

5. A coupling structure according to claim 2, wherein said light-transmitting material is a resin having a light absorption edge at a wavelength of not more than 450 nm.

6. A coupling structure according to claim 1, wherein said adhesive is a photo-curable/thermosetting adhesive containing a thermosetting initiator in addition to a photo-curable initiator.

7. A coupling structure according to claim 6, wherein said adhesive is coated to be interposed between said end face of said optical fiber arranging connector and said end face of said waveguide device, photo-cured by light radiation, and thereafter thermoset by heat.

8. A coupling structure according to claim 1, wherein a part of said second member is made of a light-transmitting material through which light having a wavelength capable of curing said adhesive can pass, whereby external light reaches to at least one part of said interposed adhesive to cure said interposed adhesive.

9. A coupling structure according to claim 1, wherein a part of said waveguide substrate is made of a light-transmitting material through which light having a wavelength capable of curing said adhesive can pass, whereby external light reaches to at least one part of said interposed adhesive to cure said interposed adhesive.

10. A coupling structure according to claim 1, wherein said first member is a fiber arranging substrate having a surface on which arranging grooves for said optical fibers are formed.

11. A coupling structure according to claim 1, wherein said fiber arranging substrate is made of a silicon, and the arranging grooves are formed by mechanical processing or anisotropic etching.

12. A coupling structure according to claim 1, wherein said fiber arranging substrate is made of a ceramic material, and the arranging grooves are formed during sintering said ceramic material.

13. A coupling structure according to claim 1, wherein said fiber arranging substrate is made of a plastic material, and the arranging grooves are formed during molding said plastic material.

14. A coupling structure according to claim 13, wherein said plastic material is a phenol resin containing a filler.

15. A coupling structure according to claim 1, wherein said first and second members are integrally formed by molding a plastic material.

16. A coupling structure for optical fibers and optical waveguides, comprising:

optical fibers;

an optical fiber arranging connector having a first and second member, said optical fibers being sandwiched by said first and second members to be fixed in said optical fiber arranging connector;

a waveguide device having a waveguide substrate and a covering member provided on said waveguide substrate, optical waveguides being formed on a surface area of said waveguide device;

a photo-curable adhesive interposed and cured between an end face of said optical fiber arranging connector and an end face of said waveguide device which abut each other;

said first member being made of a material preventing light having a wavelength capable of curing said adhesive from passing therethrough; and at least a part of said second member, said waveguide substrate and said covering member being made of a light-transmitting material through which light having a wavelength capable of curing said adhesive can pass, whereby external light reaches to at least one part of said interposed adhesive to cure said interposed adhesive.

17. A coupling structure according to claim 16, wherein said light-transmitting material is a material having a thermal expansion coefficient of less than $1 \times 10^{-6}$[/K].

18. A coupling structure according to claim 17, wherein said light-transmitting material is glass containing $SiO_2$ as a major component.

19. A coupling structure according to claim 18, wherein said light-transmitting material is glass having a thermal expansion coefficient substantially the same as that of silicon within a range of ±20%.

20. A coupling structure according to claim 16, wherein said light-transmitting material is a resin having a light absorption edge at a wavelength of not more than 450 nm.

21. A coupling structure according to claim 16, wherein said adhesive is a photo-curable/thermosetting adhesive containing a thermosetting initiator in addition to a photo-curable initiator.

22. A coupling structure according to claim 16, wherein said first member is a fiber arranging substrate having a surface on which arranging grooves for said optical fibers are formed.

23. A coupling structure according to claim 16, wherein said fiber arranging substrate is made of silicon, and the arranging grooves are formed by mechanical processing or anisotropic etching.

24. A coupling structure according to claim 16, wherein said fiber arranging substrate is made of a ceramic material, and the arranging grooves are formed during sintering said ceramic material.

25. A coupling structure according to claim 16, wherein said fiber arranging substrate is made of a plastic material, and the arranging grooves are formed during molding said plastic material.

26. A coupling structure according to claim 25, wherein said plastic material is a phenol resin containing a filler.

27. A coupling structure according to claim 16, wherein said first and second members are integrally formed by molding a plastic material.

28. A coupling structure according to claim 16, wherein a part of said second member is made of a light-transmitting material through which light having a wavelength capable of curing said adhesive can pass, whereby external light reaches to at least one part of said interposed adhesive to cure said interposed adhesive.

29. A coupling structure according to claim 16, wherein a part of said waveguide substrate is made of a light-transmitting material through which light having a wavelength capable of curing said adhesive can pass, whereby external light reaches to at least one part of said interposed adhesive to cure said interposed adhesive.

30. A coupling structure according to claim 16, wherein a part of said covering member is made of a light-transmitting material through which light having a wavelength capable of curing said adhesive can pass, whereby external light reaches to at least one part of said interposed adhesive to cure said interposed adhesive.

* * * * *